US008246805B2

(12) United States Patent
Shinoda

(10) Patent No.: US 8,246,805 B2

(45) Date of Patent: Aug. 21, 2012

(54) MICRO-FLUIDIC CHIP AND FLOW SENDING METHOD IN MICRO-FLUIDIC CHIP

(75) Inventor: Masataka Shinoda, Tokyo (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 12/485,112

(22) Filed: Jun. 16, 2009

(65) Prior Publication Data

US 2009/0308473 A1 Dec. 17, 2009

(30) Foreign Application Priority Data

Jun. 16, 2008 (JP) ................................ 2008-156118
Sep. 9, 2008 (JP) ................................ 2008-231248

(51) Int. Cl.
*G01N 27/447* (2006.01)
*G01N 27/453* (2006.01)
*F04B 19/00* (2006.01)
*B05B 5/00* (2006.01)

(52) U.S. Cl. ......... 204/601; 204/451; 422/504; 422/508

(58) Field of Classification Search .......... 422/502–504, 422/508; 204/601, 451
See application file for complete search history.

(56) References Cited

U.S. PATENT DOCUMENTS

| | | | | |
|---|---|---|---|---|
| 5,483,469 | A | 1/1996 | van den Engh et al. | |
| 5,815,054 | A * | 9/1998 | Vojak et al. | 333/191 |
| 6,028,389 | A * | 2/2000 | Bernstein | 310/324 |
| 6,149,867 | A | 11/2000 | Seidel et al. | |
| 6,224,732 | B1 | 5/2001 | Imasaka et al. | |
| 6,281,018 | B1 * | 8/2001 | Kirouac et al. | 436/63 |
| 7,428,971 | B2 | 9/2008 | Hirano et al. | |
| 7,708,949 | B2 | 5/2010 | Stone et al. | |
| 2003/0044832 | A1 | 3/2003 | Blankenstein | |
| 2003/0175980 | A1 | 9/2003 | Hayenga et al. | |
| 2005/0103690 | A1 * | 5/2005 | Kawano et al. | 209/576 |
| 2006/0078888 | A1 | 4/2006 | Griffiths et al. | |
| 2006/0078893 | A1 | 4/2006 | Griffiths et al. | |
| 2007/0215528 | A1 | 9/2007 | Hayenga et al. | |
| 2007/0268489 | A1 | 11/2007 | Schwabe | |

FOREIGN PATENT DOCUMENTS

| | | |
|---|---|---|
| JP | 7-24309 | 1/1995 |
| JP | 2003-107099 | 4/2003 |
| JP | 2004-167479 | 6/2004 |
| JP | 2005-049273 | 2/2005 |
| JP | 2006-507921 | 3/2006 |
| JP | 2006-115856 | 5/2006 |
| JP | 2007-046947 | 2/2007 |
| JP | 2008-518884 | 6/2008 |

OTHER PUBLICATIONS

European Office Action dated Oct. 13, 2009, for corresponding Patent Application 09007632.4-1270.
Japanese Office Action issued on Apr. 27, 2010, corresponding to Japanese Patent Appln. No. 2008-231248.

* cited by examiner

*Primary Examiner* — Alex Noguerola
(74) *Attorney, Agent, or Firm* — K&L Gates LLP

(57) ABSTRACT

Disclosed herein is a micro-fluidic chip including a hollow area into which a charged droplet is introduced, and an electrode configured to be provided toward the hollow area. Movement direction of a droplet in the hollow area is controlled based on electric force acting between a charge given to the droplet and the electrode.

11 Claims, 14 Drawing Sheets

MICRO-FLUIDIC CHIP AND FLOW SENDING METHOD IN MICRO-FLUIDIC CHIP

CROSS REFERENCES TO RELATED APPLICATIONS

The present application claims priority to Japanese Priority Patent Application JP 2008-156118 filed in the Japan Patent Office on Jun. 16, 2008 and Japanese Priority Patent Application JP 2008-231248 filed in the Japan Patent Office on Sep. 9, 2008, the entire contents of which are hereby incorporated by reference.

BACKGROUND

The present application relates to a micro-fluidic chip, a liquid analysis device in which this micro-fluidic chip can be incorporated, and a flow sending method in this micro-fluidic chip. More specifically, the present application relates to a micro-fluidic chip and so on in which a charged droplet is introduced into a hollow area provided in the micro-fluidic chip and the movement direction of the droplet in the hollow area is controlled based on electric force.

In recent years, development is being advanced on micro-fluidic chips obtained by providing areas and flow channels for performing chemical and biological analysis on a substrate made of silicon or glass by applying microfabrication techniques in the semiconductor industry. These micro-fluidic chips have started to be used as e.g. electrochemical detectors for liquid chromatography and small electrochemical sensors in medical scenes.

The analysis system with such a micro-fluidic chip is referred to as a micro-total-analysis system (μ-TAS), a lab-on-chip, a biochip, and so on, and attracts attention as a technique that allows enhancement in the speed, efficiency, and integration degree of chemical and biological analysis and size reduction of analysis devices.

The μ-TAS is expected to be applied to biological analysis in which a tiny amount of a precious sample or a large number of specimens are treated particularly due to e.g. the reasons that the analysis is possible with a small amount of a sample and disposable (throwaway) chips can be used.

Application examples of the μ-TAS include a microparticle analysis technique in which characteristics of microparticles such as cells or microbeads are analyzed optically, electrically, or magnetically in a flow channel provided on a micro-fluidic chip. In this microparticle analysis technique, fractional collection of a population (group) that satisfies a predetermined condition from microparticles as a result of the analysis is also carried out.

Regarding this microparticle sorting technique, a particle fractionation device employing laser trapping is disclosed in Japanese Patent Laid-Open No. Hei 7-24309. This particle fractionation device irradiates moving particles such as cells with scanning light to thereby give the particles the acting force dependent on the kind of particle and sort the particles.

As a similar technique, a microparticle collection device employing optical force (or optical pressure) is disclosed in Japanese Patent Laid-Open No. 2004-167479. This microparticle collection device irradiates a flow channel of microparticles with a laser beam intersecting with the flow direction of the microparticles to thereby deflect the movement direction of the microparticles that should be collected in the convergence direction of the laser beam and collect the microparticles.

Furthermore, in Japanese Patent Laid-Open No. 2003-107099, a microparticle fractionation micro-fluidic chip having an electrode for controlling the movement direction of microparticles is disclosed. This electrode is disposed near the flow channel port from a microparticle measurement part to a microparticle fractionation flow channel, and serves to control the movement direction of microparticles by interaction with an electric field.

SUMMARY

As disclosed in the above-cited Patent Documents, in the μ-TAS of the related arts, acting force is directly given to microparticles in a liquid that flows in a flow channel in a certain direction by laser trapping, optical force, electricity, or the like, to thereby cause the microparticles to move in a direction different from the flow direction of the liquid, so to speak, against the flow. Therefore, in order to control the flow sending direction of the microparticles, considerably-large acting force has to be given to the microparticles.

However, for the system that directly gives acting force to microparticles by laser trapping, optical force, electricity, or the like, it is difficult to give acting force sufficient to control the flow sending direction of the microparticles at high speed and with high accuracy.

There is a desire for the present application to provide a micro-fluidic chip that can control the flow sending direction of microparticles at high speed and with high accuracy.

According to an embodiment, there is provided a micro-fluidic chip that includes a hollow area into which a charged droplet is introduced and an electrode provided toward this hollow area. This micro-fluidic chip further includes a plurality of branch areas communicating with the hollow area. Due to this feature, in the micro-fluidic chip according to an embodiment, a droplet can be led to one branch area that is arbitrarily selected by controlling the movement direction of the droplet in the hollow area, based on electric force acting between the charge given to the droplet and the electrode.

Furthermore, the micro-fluidic chip according to an embodiment includes any of the following configurations (1) to (4).

Specifically, this micro-fluidic chip includes a flow channel that sends a liquid into the hollow area, and (1) a piezoelectric element for turning a liquid to a droplet at a communicating port of this flow channel to the hollow area, or (2) a fluid inlet that meets this flow channel at least from one side of the flow channel and introduces a fluid that is a gas or an insulating liquid into the flow channel to thereby segment a liquid passing through the flow channel and turn the liquid to a droplet.

This micro-fluidic chip includes (3) a microtube that introduces a first liquid into the laminar flow of a second liquid passing through the flow channel. Due to this feature, in the micro-fluidic chip according to an embodiment, the first liquid and the second liquid can be sent to the communicating port of the flow channel or a confluence of the fluid inlet in such a way that the laminar flow of the first liquid introduced from the microtube is surrounded by the laminar flow of the second liquid.

(4) In the flow channel a narrowing part that is so formed that the area of the section thereof perpendicular to the liquid sending direction gradually decreases is provided. Due to this feature, the first liquid and the second liquid can be so sent that the laminar flow widths of both the laminar flows of these liquids are narrowed.

In this micro-fluidic chip, (5) the microtube is formed of a metal to which voltage can be applied. This can give a charge to the first liquid and the second liquid passing through the flow channel. For this feature, it is preferable to provide a grounded electrode toward the area in which a liquid is turned to a droplet and is given a charge in the flow channel.

The above-described configurations make it possible to sort a microparticle contained in the first liquid into arbitrarily-selected one of the branch areas in the micro-fluidic chip according to the embodiment. This branch area can be filled with a gel for cell culture.

In addition, according to another embodiment, there are provided a liquid analysis device and a microparticle sorting device in which the above-described micro-fluidic chip can be incorporated.

Furthermore, according to yet another embodiment, there is provided a flow sending method in a micro-fluidic chip. This flow sending method includes the steps of introducing a charged droplet into a hollow area provided in the micro-fluidic chip and controlling the movement direction of the droplet in the hollow area based on electric force acting between an electrode provided toward the hollow area, and a charge given to the droplet.

In this flow sending method, the droplet can be led to any one branch area selected from a plurality of branch areas communicating with the hollow area by controlling the movement direction of the droplet in the hollow area.

In this flow sending method, one of the following two configurations can be employed. Specifically, in one configuration, a liquid is turned to a droplet by using a piezoelectric element at a communicating port, to the hollow area, of a flow channel that sends the liquid to the hollow area and simultaneously a charge is given to the liquid to thereby form a charged droplet and send the charged droplet into the hollow area. In the other configuration, a liquid passing through a flow channel that sends the liquid into the hollow area is segmented and turned to a droplet by introducing a fluid that is a gas or an insulating liquid into the flow channel and simultaneously a charge is given to the liquid to thereby form a charged droplet and send the charged droplet into the hollow area.

In this flow sending method, it is possible that a liquid containing microparticles is introduced and this liquid is segmented and turned to a droplet in units of a predetermined number of microparticles to thereby sort a droplet containing the microparticle into arbitrarily-selected one of the branch areas.

In an embodiment, the term "liquid" should be broadly interpreted and encompasses homogeneous liquids and suspensions, i.e. liquids containing microparticles, liquids containing small bubbles, and so on. The "liquid" may be an aqueous liquid, an organic liquid, or a two-phase liquid, and may be a hydrophobic liquid or a hydrophilic liquid. Furthermore, the term "gas" should also not be narrowly interpreted but broadly encompasses air and gasses such as nitrogen.

In an embodiment, the "microparticle" broadly encompasses biologically relevant microparticles such as cells, microorganisms, and liposomes, and synthetic particles such as latex particles, gel particles, and industrial particles, and so on.

The biologically relevant microparticles encompass chromosomes, liposomes, mitochondrias, organelles, and so on included in various kinds of cells. The cells as the subject encompass animal cells (hemocyte cells and so on) and plant cells. The microorganisms encompass bacteria such as coliforms, viruses such as tobacco mosaic viruses, fungi such as yeasts, and so on. Moreover, the biologically relevant microparticles also encompass biologically relevant polymers such as nucleic acids, proteins, and complexes of these substances. The industrial particles may be composed of e.g. an organic or inorganic polymer material or a metal. The organic polymer material encompasses polystyrene, styrene divinylbenzene, polymethylmethacrylate, and so on. The inorganic polymer material, encompasses glass, silica, magnetic materials, and so on. The metal encompasses gold colloids, aluminum, and so on. In general, the shape of these microparticles is a sphere. However, it may be a nonspherical shape, and the size, mass, and so on of the microparticles are also not particularly limited.

In an embodiment a micro-fluidic chip is provided that can control the flow sending direction of microparticles at high speed and with high accuracy.

Additional features and advantages of the present invention are described in, and will be apparent from, the following Detailed Description and the figures.

DETAILED DESCRIPTION

The present application will be described in greater detail below with reference to the drawings. It should be noted that the embodiments to be described below are representative example of embodiments of the present application, and thus should not limit the scope of the present application.

1. Micro-Fluidic Chip A

Figure 1:
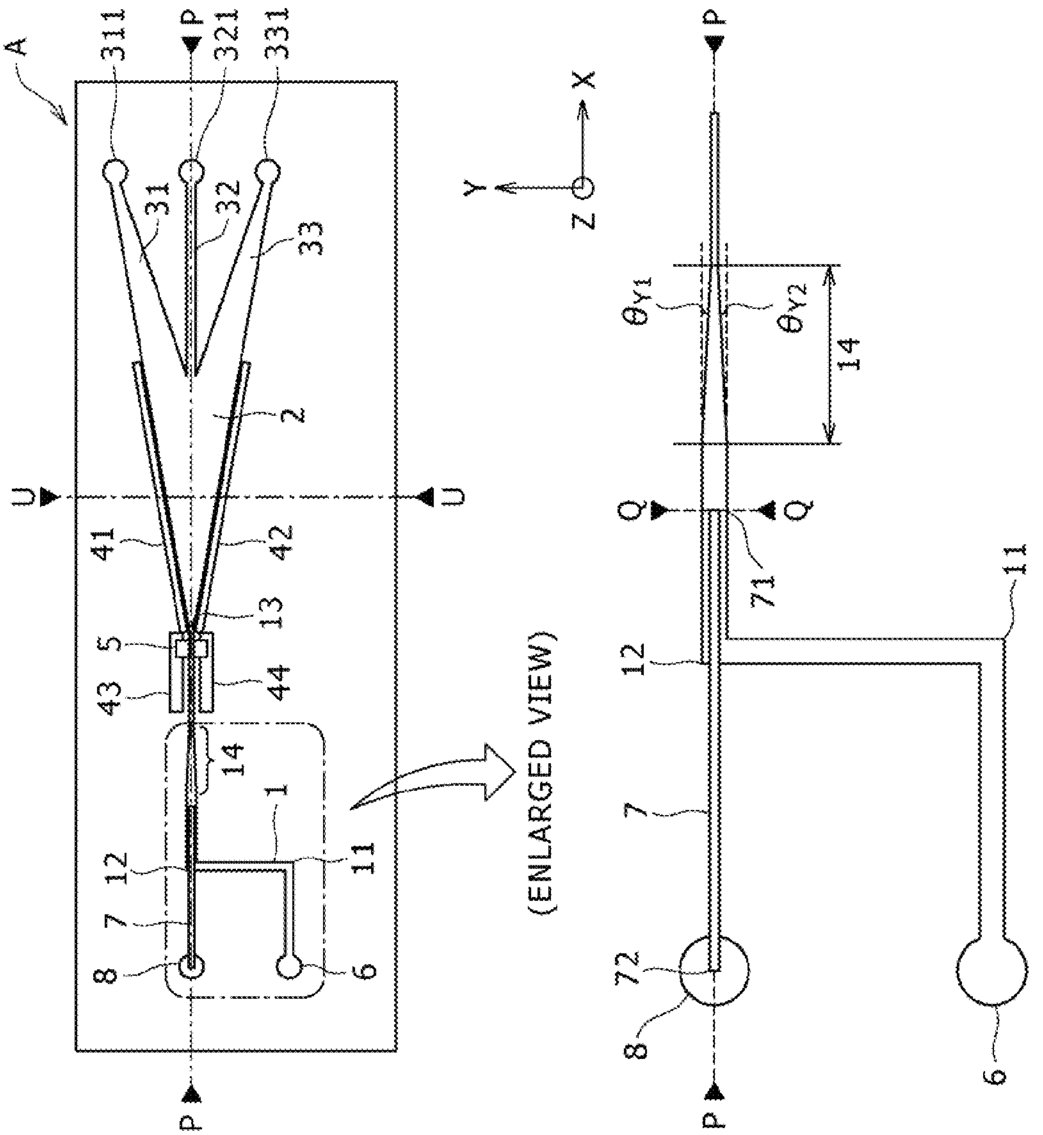
FIG. 1 is a simplified top view showing the structure of a micro-fluidic chip according to a first embodiment.

FIG. 1 is a simplified top view showing the structure of a micro-fluidic-chip according to a first embodiment. The micro-fluidic chip indicated by symbol A in the diagram is favorably used to sort microparticles by causing a liquid containing the microparticles to pass through this micro-fluidic chip.

(1-1) Hollow Area

The micro-fluidic chip A includes a flow channel 1 having bent parts 11 and 12 at which the path is bent substantially 90 degrees, a hollow area 2 (hereinafter, referred to as the "cavity 2") communicating with this flow channel 1, and branch areas 31, 32, and 33 communicating with the cavity 2. Into the cavity 2, charged droplets sent from the flow channel 1 are introduced.

In FIG. 1, numerals 41 and 42 denote a pair of electrodes for movement direction control (hereinafter, referred to simply as the "electrodes") that are provided toward the internal space of the cavity 2. In the micro-fluidic chip A, the movement direction of droplets in the cavity 2 can be controlled based on the electric force between the electrodes 41 and 42 and the charge given to the droplets introduced into the cavity 2. This makes it possible to selectively lead the droplets to any of the branch areas 31, 32, and 33 in the micro-fluidic chip A. In FIG. 1, numerals 311, 321, and 331 denote outlets for discharging the droplets lead to the branch areas 31, 32, and 33 to the outside of the micro-fluidic chip A.

As above, the micro-fluidic chip A is characterized by introducing droplets into the cavity 2 after charging the droplets, and control ling the movement direction of the droplets based on electric force in the free space in the cavity 2. Thus, by causing the droplet introduced into the cavity 2 to contain a microparticle, the movement direction of the microparticle can be controlled by large electric acting force that acts on the whole of the droplet. In addition, because the control of the movement direction of the droplets containing the microparticles is carried out in the free space in the cavity 2, the influence of the frictional force with the flow channel wall is small, and the movement direction can be changed at higher speed and with higher accuracy compared with the case of controlling the movement direction in a flow channel through which another fluid passes in a constant direction.

(1-2) Piezoelectric Element

In FIG. 1, numeral 5 denotes a piezoelectric element for turning the liquid passing through the flow channel 1 to droplets and sending the flow of the droplets to the cavity 2. This piezoelectric element 5 turns the passing liquid to the droplets at a communicating port 13 of the flow channel 1 to the cavity 2.

The piezoelectric element 5 is provided upstream of the communicating port 13 of the flow channel 1 and toward the inside of the flow channel 1. The piezoelectric element 5 deforms when voltage is applied thereto, and applies vibration to the liquid passing through the flow channel 1. Upon receiving the vibration from the piezoelectric element 5, the liquid in the flow channel 1 is elected from the communicating port 13 of the flow channel 1 into the cavity 2. At this time, the liquid can be ejected into the cavity 2 as droplets by vibrating the piezoelectric element 5 with use of a pulse voltage as the voltage applied to the piezoelectric element 5. If a liquid containing microparticles is caused to pass through the flow channel 1, droplets containing the microparticles can be elected into the cavity 2.

Such turning of a liquid to droplets by use of the piezoelectric element 5 can be carried out similarly to e.g. ejection of ink droplets by use of a piezo vibrating element, employed in an ink jet printer.

(1-3) Microtube

In FIG. 1, numeral 6 denotes an inlet for introducing a liquid (defined as the "liquid T") into the flow channel 1. Across the bent part 12 of the flow channel 1, a microtube 7 is provided for introducing another liquid (defined as the "liquid S") into the laminar flow of the liquid T that is supplied from this inlet 6 and passes through the flow channel 1. It is to be noted that the liquid S is also referred to as a first liquid, and the liquid T is referred to as a second liquid.

The following description will be made by taking as an example the case of sorting microparticles by use of the micro-fluidic chip A and based on the assumption that a sheath liquid T is introduced as the liquid T from the inlet 6 and a sample liquid S containing microparticles is introduced as the liquid S from the microtube 7. Specifically, the sample liquid S supplied from a sample liquid inlet indicated by numeral 8 is introduced by the microtube 7 into the laminar flow of the sheath liquid T that is supplied from the inlet 6 (hereinafter, referred to as the "sheath liquid inlet 6") and passes through the flow channel 1. In FIG. 1, numeral 71 denotes an opening of the microtube 7 at the end thereof in the flow channel 1, and numeral 72 denotes an opening of the microtube 7 at the end thereof in the sample liquid inlet 8.

In the micro-fluidic chip A, by introducing the sample liquid S into the laminar flow of the sheath liquid T passing through the flow channel 1 by the microtube 7 in this manner, the liquids can be sent in such a way that the laminar flow of the sample liquid S is surrounded by the laminar flow of the sheath liquid T.

Furthermore, this microtube 7 is formed of a metal to which voltage can be applied, and can give a positive or negative charge to the sheath liquid T and the sample liquid S passing through the flow channel 1. As described later, by applying voltage to the microtube 7 when the sheath liquid T and the sample liquid S are turned to droplets and ejected into the cavity 2, a positive or negative charge can be given to the droplets to be ejected. It is also possible that, voltage is not applied to the microtube and thus a charge is not given to the sheath liquid T and the sample liquid S passing through the flow channel 1. In this case, it is possible to cause the droplets to be ejected to carry no charge because voltage is not applied to the microtube 7 when the sheath liquid T and the sample liquid S are turned to the droplets and ejected into the cavity 2.

In order to accurately give a charge to droplets and stabilize the charged state of the droplets, in the micro-fluidic chip A, electrodes 43 and 44 that are grounded (hereinafter, referred to as the "ground electrodes 43 and 44") are provided toward the area in which the liquids are turned to droplets and given a charge in the flow channel 1, i.e. the flow channel 1 in the vicinity of the piezoelectric element 5.

The charged droplets are introduced into the cavity 2 and the movement direction thereof in the cavity 1 is controlled based on the electric force between the given charge and the electrodes 41 and 42. For accurate control of the movement direction, an accurate, stable charge should be given to the droplets. In the micro-fluidic chip A, the area in which the liquids are turned to droplets and given a charge is adjacent to the electrodes 41 and 42. This involves the possibility that a potential arises in the droplets due to the influence of a high potential of the electrodes 41 and 42 and thus the charged state of the droplets, offered by the microtube 7, becomes unstable.

To avoid this, in the micro-fluidic chip A, the ground electrodes 43 and 44 are provided toward the flow channel 1 in the vicinity of the piezoelectric element 5 so that the high potential of the electrodes 41 and 42 may be prevented from affecting the area in which the liquids are turned to droplets. This feature makes it possible to give an accurate charge to droplets and accurately control the movement direction of the droplets.

(1-4) Narrowing Part

In FIG. 1, numeral 14 denotes a narrowing part provided in the flow channel 1. The narrowing part 14 is so formed that the area of the section thereof perpendicular to the liquid sending direction gradually decreases in the direction from the upstream side of the flow channel toward the downstream side. Specifically, the flow channel sidewalls of the narrowing part 14 are so formed that the flow channel is gradually narrowed in the Y-axis positive and negative directions in the diagram along the liquid sending direction. Thus, the narrowing part 14 can be regarded as a spindle shape that is gradually thinned in top view. This shape allows the narrowing part 14 to send the liquids in such a manner as to narrow the laminar flow widths of the laminar flows of the sheath liquid T and the sample liquid S in the Y-axis positive and negative directions in the diagram. Moreover, the narrowing part 14 is so formed that the flow channel bottom surface thereof is an inclined surface whose height in the depth direction (the Z-axis positive direction) increases in the direction from the upstream side toward the downstream side, and thus can narrow the laminar flow widths also in this direction (the details thereof will be described below).

2. Liquid Flow Sending Method in Micro-Fluidic Chip A

A flow sending method for the sample liquid S and the sheath liquid T in the micro-fluidic chip A will be described below in order from the upstream side of the flow sending direction.

(2-1) Formation of Laminar Flows by Microtube

Figure 2A:
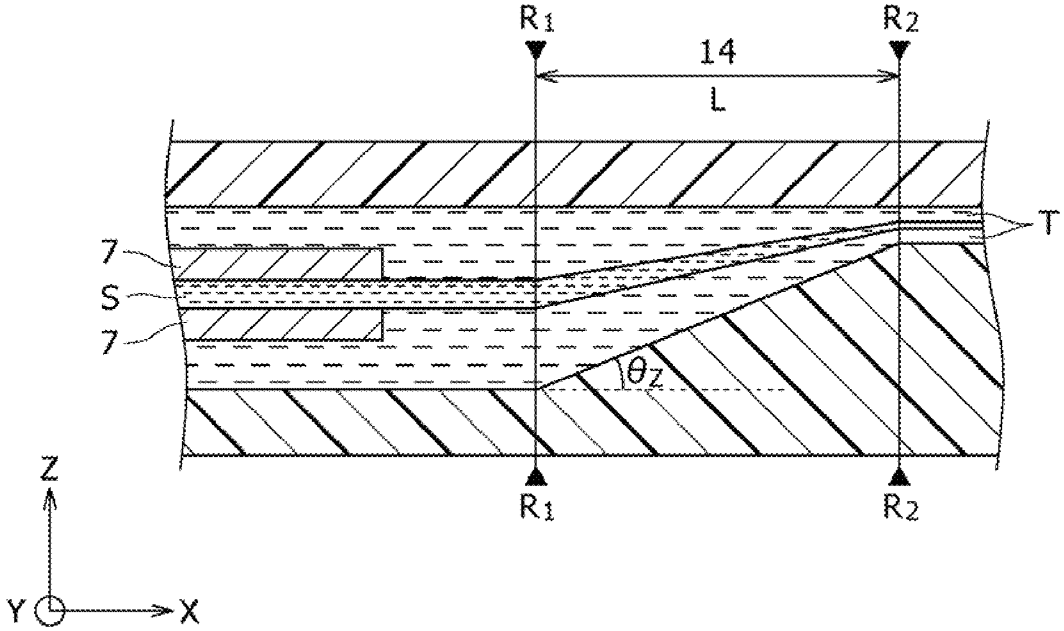
FIGS. 2A and 2B are schematic diagrams showing the laminar flows of a sheath liquid and a sample liquid formed in a flow channel, FIG. 2A being a sectional view corresponding to the section along line P-P in the enlarged view of FIG. 1 and FIG. 2B being a sectional view corresponding to the section along line Q-Q.
Figure 2B:
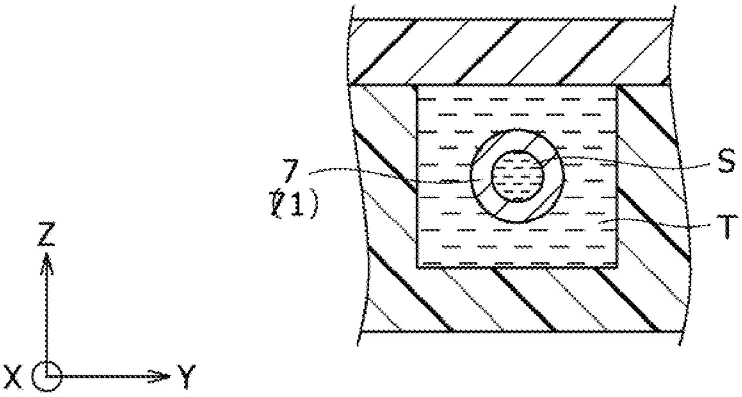

FIG. 2 is a schematic diagram showing the laminar flows of the sheath liquid T and the sample liquid S formed in the flow channel 1. FIG. 2A is a sectional view corresponding to the section along line P-P in the enlarged view of FIG. 1, and shows the opening 71 of the microtube 7 and the narrowing part 14 of the flow channel 1 in an enlarged manner. FIG. 2B is a sectional view corresponding to the section along line Q-Q in the enlarged view of FIG. 1, and shows the opening 71 viewed straightforward from the downstream side of the flow channel 1.

By introducing the sample liquid S into the laminar flow of the sheath liquid T passing through the flow channel 1 (see symbol T in the diagram) by the microtube 7, the liquids can be sent in such a way that the laminar flow of the sample liquid S is surrounded by the laminar flow of the sheath liquid T as shown in FIG. 2A. Hereinafter, the laminar flow of the sample liquid S will be referred to simply as the "sample liquid laminar flow S", and the laminar flow of the sheath liquid T will be referred to simply as the "sheath liquid laminar flow T".

In the structure shown in FIG. 2, the microtube 7 is so provided that the center thereof is coaxial with the center of the flow channel 1. In this case, the sample liquid laminar flow S is introduced into the center of the sheath liquid laminar flow T passing through the flow channel 1. The formation position of the sample liquid laminar flow S in the sheath liquid laminar flow T can be set to any position through adjustment of the provision position of the microtube 7 in the flow channel 1.

(2-2) Narrowing of Laminar Flow Widths by Narrowing Part

The narrowing part 14 is so formed that the area of the section thereof perpendicular to the liquid sending direction gradually decreases in the direction from the upstream side of the flow channel toward the downstream side. Specifically, as shown in FIG. 2A, the narrowing part 14 is so formed that the flow channel bottom surface thereof is an inclined surface whose height in the Z-axis positive direction increases in the direction from the upstream side toward the downstream side. Due to this shape, the laminar flow widths of the sheath liquid laminar flow T and the sample liquid laminar flow S sent to the narrowing part 14 are narrowed in the Z-axis positive direction in such a way that the sheath liquid laminar flow T and the sample liquid laminar flow S are deflected toward, the upper surface side of the micro-fluidic chip A.

Figure 3A:
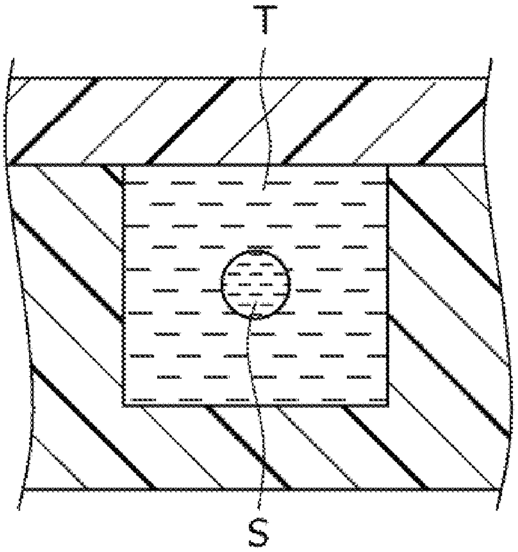
FIGS. 3A and 3B are schematic diagrams showing a sheath liquid laminar flow and a sample liquid laminar flow on the upstream side and the downstream side, respectively, of a narrowing part.
Figure 3A:
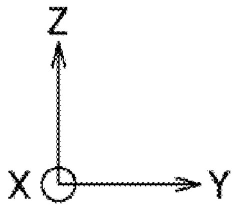
Figure 3B:
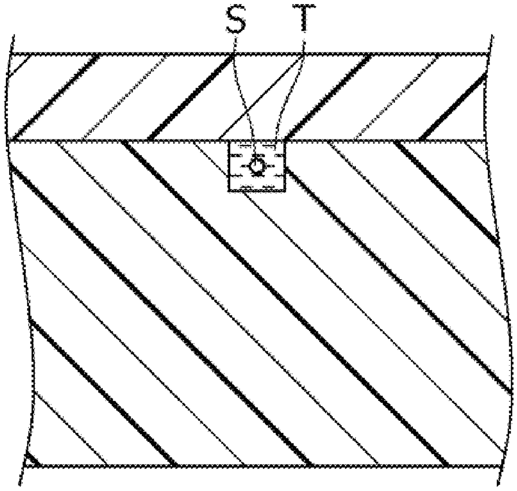

FIG. 3 is a schematic diagram showing the sheath liquid laminar flow T and the sample liquid laminar flow S on the upstream side (FIG. 3A) and the downstream side (FIG. 3B) of the narrowing part 14. FIG. 3A is a sectional view corresponding to the section along line $R_1$-$R_1$ in FIG. 2, and FIG. 3B is a sectional view corresponding to the section along line $R_2$-$R_2$ in FIG. 2.

As described above with FIG. 1, the narrowing part 14 is formed into a spindle shape that is gradually thinned in the Y-axis positive and negative directions along the direction from the upstream side toward the downstream side. Furthermore, as described with FIG. 2, the flow channel bottom surface of the narrowing part 14 is formed as an inclined surface whose height in the Z-axis positive direction increases in the direction from the upstream side toward the downstream side. By forming the narrowing part 14 in such a way that the area of the section thereof perpendicular to the liquid sending direction gradually decreases in the direction from the upstream side of the flow channel toward the downstream side in this manner, the sheath liquid laminar flow T and the sample liquid laminar flow S can be so sent as to be deflected toward the upper surface side of the micro-fluidic chip A (in the Z-axis positive direction in FIG. 3) in such a way that the laminar flow widths thereof are narrowed in the Y-axis and Z-axis directions. That is, the sheath liquid laminar flow T and the sample liquid laminar flow S shown in FIG. 3A are so sent that the laminar flow widths thereof are narrowed in the narrowing part 14 as shown in FIG. 3B.

The following advantage is achieved by sending the liquids in such a way that the laminar flow widths of the sheath liquid laminar flow and the sample liquid laminar flow are narrowed. Specifically, in the case of performing optical analysis on microparticles by causing a solution containing the microparticles to pass through the flow channel as the sample liquid, the microparticles in the narrowed sample liquid laminar flow can be irradiated with measurement light with hi ah accuracy. This narrowing of the laminar flow widths of the sheath liquid laminar flow and the sample liquid laminar flow can be achieved also by forming each of the flow channel bottom surface and top surface of the narrowing part 14 as an inclined surface.

In particular, the narrowing part 14 can narrow the laminar flow width of the sample liquid laminar flow not only in the horizontal direction of the micro-fluidic chip A (the Y-axis direction in FIG. 1) but also in the vertical direction (the Z-axis direction in FIG. 2). Thus, the focus position of the measurement light in the depth direction of the flow channel 1 can be exhaustively matched with the flow sending position of the microparticles. Accordingly, it is possible to irradiate the microparticles with the measurement light with high accuracy and obtain high measurement sensitivity.

It may also be possible to form the sheath liquid laminar flow and the sample liquid laminar flow whose laminar flow widths are narrowed in advance, if the flow channel 1 is formed as a sufficiently-thin flow channel and the sample liquid is introduced into the sheath liquid laminar flow passing through this flow channel 1 by using the microtube 7 whose diameter is small. However, this case possibly causes a problem that the microparticles contained in the sample liquid get stuck in the microtube 7 due to the small diameter of the microtube 7.

In the micro-fluidic chip A, due to the provision of the narrowing part 14, the laminar flow widths can be narrowed after the sample liquid laminar flow and the sheath liquid laminar flow are formed with use of the microtube 7 whose diameter is sufficiently larger than that of the microparticles contained in the sample liquid. Thus, the above-described problem of clogging of the microtube 7 can be eliminated.

The inner diameter of the microtube 7 can be accordingly set depending on the diameter of the microparticles contained in the sample liquid as the analysis subject. For example, when blood is used as the sample liquid and analysis of hemocyte cells is performed, the preferable inner diameter of the microtube 7 is about 10 to 500 μm. Furthermore, the width and depth of the flow channel 1 are accordingly set depending on the outer diameter of the microtube 7, which reflects the diameter of the microparticles as the analysis subject. For example, when the inner diameter of the microtube 7 is about 10 to 500 μm, it is preferable that each of the width and depth of the flow channel 1 be about 100 to 2000 μm. The sectional shape of the microtube may be, instead of a circular shape, any shape such as an ellipsoidal shape, a quadrangular shape, or a triangular shape.

The laminar flow widths of the sheath liquid laminar flow and the sample liquid laminar flow before the narrowing by the narrowing part 14 change depending on the width and depth of the flow channel 1 and the diameter of the microtube 7. However, the laminar flow widths can be narrowed to any width by accordingly adjusting the area of the section of the narrowing part 14 perpendicular to the liquid sending direction. For example, if the flow channel length of the narrowing part 14 is defined as L and the inclination angle of the flow channel bottom surface thereof is defined as $\theta_Z$ in FIG. 2, the narrowing amount of the laminar flow widths of the sheath liquid laminar flow T and the sample liquid laminar flow S in the narrowing part 14 is $L \cdot \tan \theta_Z$. Therefore, any narrowing amount can be set by accordingly adjusting the flow channel length L and the inclination angle $\theta_Z$. Furthermore, if the narrowing angles of the flow channel sidewalk of the narrowing part 14 in the Y-axis direction are defined as $\theta_{Y1}$ and $\theta_{Y2}$ in FIG. 1 and these angles are equalized to the above-described angle $\theta_Z$, the sheath liquid laminar flow T and the sample liquid laminar flow S can be narrowed with isotropic width reduction as shown in FIGS. 3A and 3B.

Figure 4:
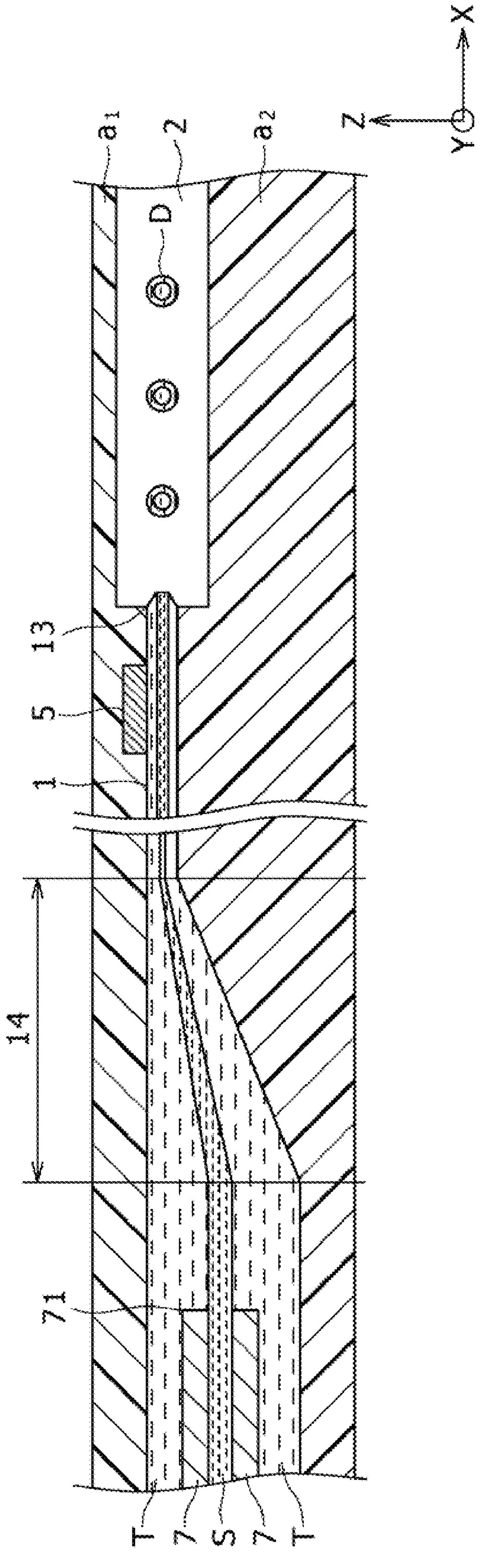
FIG. 4 is a schematic diagram showing the sheath liquid laminar flow and the sample liquid laminar flow around a communicating port of the flow channel to a cavity.

(2-3) Turing of Liquid to Droplets by Piezoelectric Element and Charging by Microtube FIG. 4 is a schematic diagram showing the sheath liquid laminar flow T and the sample liquid laminar flow S around the communicating port 13 of the flow channel 1 to the cavity 2. This diagram is a sectional view corresponding to the section along line P-P in the enlarged view of FIG. 1, and shows the vicinity of the opening 71 of the microtube 7 and the flow channel 1 in the vicinity of the communicating port 13 in an enlarged manner.

The sheath liquid laminar flow T and the sample liquid laminar flow S are sent to the communicating port 13 in such a way that the sample liquid laminar flow S is surrounded by the sheath liquid laminar flow T and the widths of both the laminar flows are narrowed, due to the microtube 7 and the narrowing part 14.

Pressure is applied to the sheath liquid laminar flow T and the sample liquid laminar flow S by applying a pulse voltage to the piezoelectric element 5, which is provided upstream of the communicating port 13 and toward the inside of the flow channel 1. Thereupon, the sheath liquid laminar flow T and the sample liquid laminar flow S are turned to droplets and ejected into the cavity 2. In FIG. 4, symbol D denotes the droplets ejected from the communicating port 13 into the cavity 2. This droplet D is composed of the sheath liquid and the sample liquid and includes the microparticles contained in the sample liquid.

Furthermore, by applying voltage to the microtube 7 formed of a metal simultaneously with the turning of the liquids to the droplets by the piezoelectric element 5, a positive or negative charge can be given to the droplets D to be elected into the cavity 2. For example, if a positive voltage is applied to the microtube 7 to thereby give a positive charge to the sheath liquid laminar flow T and the sample liquid laminar flow S passing through the flow channel 1, the droplets D ejected into the cavity 2 carry a positive charge. In contrast, if a negative voltage is applied to the microtube 7, a negative charge can be given to the droplets D to be ejected into the cavity 2.

Furthermore, the positively-charged droplets D and the negatively-charged droplets D can be alternately ejected into the cavity 2 by switching the voltage applied to the microtube 7 at the moment when the sheath liquid laminar flow T and the sample liquid laminar flow S are turned to the droplets and ejected from the communicating port 13 into the cavity 2. In this case, the voltage applied to the microtube 7 is a pulse voltage in synchronization with the pulse voltage applied to the piezoelectric element 5 for turning the liquids to the droplets.

Figure 5:
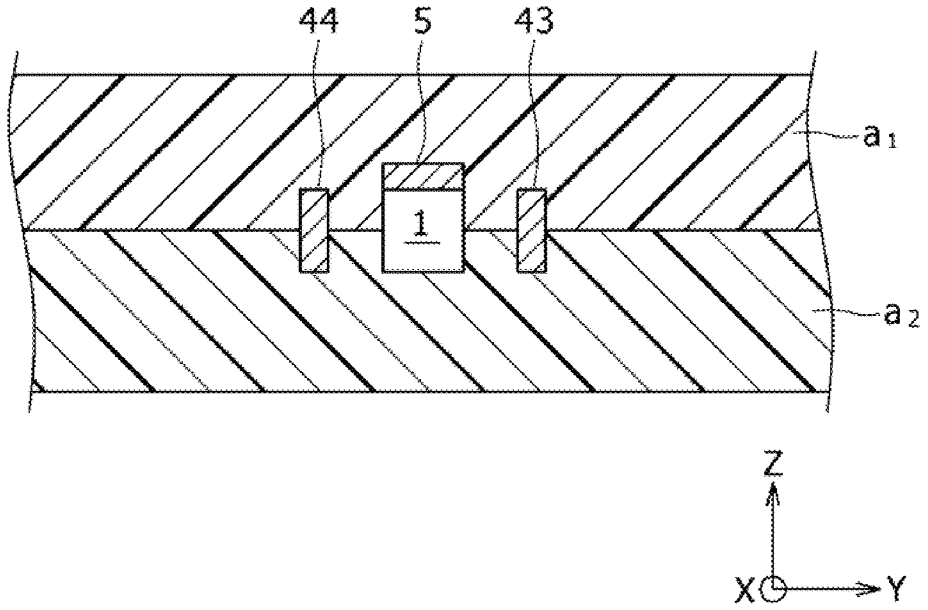
FIG. 5 is a schematic diagram showing ground electrodes and provided toward the flow channel near a piezoelectric element.

FIG. 5 is a schematic diagram showing the ground electrodes 43 and 44, which are provided toward the flow channel 1 near the piezoelectric element 5. This diagram is a sectional, view along a YZ plane including the piezoelectric element 5.

The ground electrodes 43 and 44 function to eliminate the influence of potential from the electrodes 41 and 42 for controlling the movement direction in the cavity 2 and stabilize the charged state of the droplets, offered by the microtube 7. The provision positions of the ground electrodes 43 and 44 may be any position as long as these positions are toward the area in which the liquids are turned to the droplets and given a charge in the flow channel 1.

Figure 6:
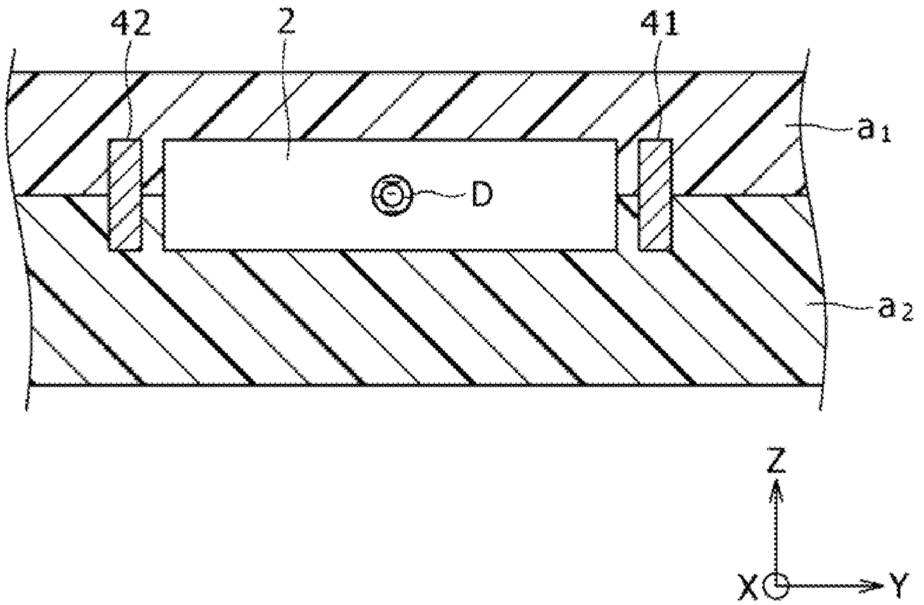
FIG. 6 is a schematic diagram showing a droplet sent into the cavity.

(2-4) Control of Movement Direction of Droplets in Hollow Area (2-4-1) Movement Control Regarding One-Dimensional Directions FIG. 6 is a schematic diagram showing the droplet D sent into the cavity 2. This diagram is a sectional view corresponding to the section along line U-U in FIG. 1.

The movement direction, in the cavity 2, of the droplet D that is given a positive or negative charge and sent into the cavity 2 is controlled based on electric force with respect to the pair of electrodes 41 and 42, which are provided toward the internal space of the cavity 2.

For example, as shown In the diagram, if a positive charge is given to the droplet D by the microtube 7, negatively charging the electrode 41 and positively charging the electrode 42 allow the droplet D to be moved in the Y-axis positive direction due to electric attractive force by the electrode 41 and repulsive force by the electrode 42.

To move the droplet D in the Y-axis negative direction, the electrode 41 is positively charged and the electrode 42 is negatively charged In this manner, in the micro-fluidic chip A, the movement direction of droplets in the cavity 2 can be controlled based on the electric force between the electrodes 41 and 42 and the charge given to the droplets introduced into the cavity 2. Therefore, also for the microparticles contained in the droplet, the movement direction thereof is controlled by large force acting on the whole of the droplet.

It is preferable to perform water-repellent treatment processing for the surface of the cavity 2 in order to keep the droplet state of the sheath liquid and the sample liquid. If the droplets partially communicate with each other in the cavity 2, the charge of the droplets disappears and thus the control of the movement direction of the droplets possibly may become impossible or inaccurate. As the water-repellent processing, surface treatment by application of a typically-used silicon resin water-repellent agent or fluorine resin water-repellent agent, or deposition of an acrylic silicone water-repellent film or a fluorine water-repellent film is available. In addition, it is also possible to give water repellency by forming a microstructure on the flow channel surface.

Furthermore, in order to maintain the charge given to the respective droplets, it is also effective to give the electrical insulating property to the surface of the cavity 2 to thereby prevent the movement of the charge between the droplets. The electrical insulating property can be given e.g. by applying or depositing a substance having the insulating property on the surface of the cavity 2.

The internal space of the cavity 2 may be filled with a gas or a liquid. In particular, if it is filled with a liquid having the electrical insulating property, such as ultrapure water, electrical conduction between the droplets can be prevented. Furthermore, for preventing electrical conduction between the droplets, it is also effective to use a liquid having the electrical Insulating property as the sheath liquid and turn the liquids to droplets in such a way that the sample liquid given a charge by the microtube 7 is surrounded by the insulating sheath liquid. However, if the cavity 2 is filled with a liquid, this liquid yields resistance against the movement of droplets. Therefore, possibly the movement direction of droplets can be controlled at higher speed and with higher accuracy when the cavity 2 is filled with a gas, which yields less resistance.

Figure 7:
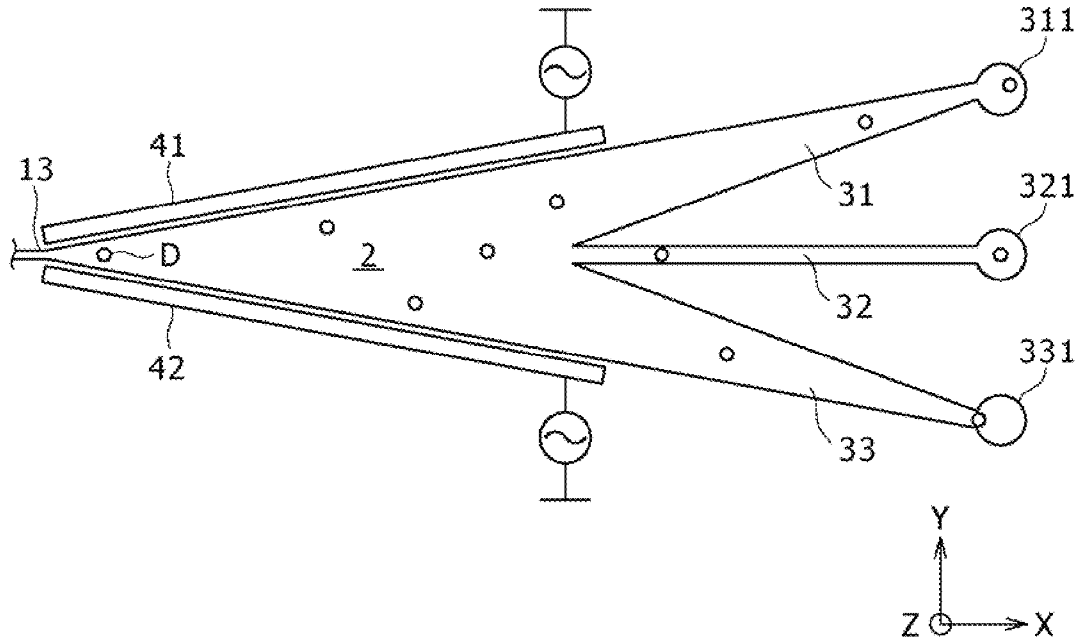
FIG. 7 is a schematic diagram showing the droplets to be led to branch areas through control of the movement direction of the droplets in the cavity.

FIG. 7 is a schematic diagram showing the droplets D to be led to the branch areas through control of the movement direction of the droplets D in the cavity 2. This diagram is a simplified top view showing the cavity 2 and the branch areas 31, 32, and 33 in an enlarged manner.

As described above, the movement direction of the droplets D sent into the cavity 2 can be controlled regarding the Y-axis positive and negative directions based on the electric force between the given charge and the electrodes 41 and 42. Therefore, for example, if the droplet D is given a positive charge by the microtube 7, the droplet D can be moved in the Y-axis positive direction and be led to the branch area 31 by negatively charging the electrode 41 and positively charging the electrode 42.

To move the droplet D in the Y-axis negative direction and lead it to the branch area 33, the electrode 41 is positively charged and the electrode 42 is negatively charged. This droplet D can be led to the branch area 32 if voltage is applied to neither the electrode 41 nor the electrode 42 and thus no electric force acts on the droplet D.

In this manner, in the micro-fluidic chip A, the electrodes 41 and 42 are accordingly charged positively or negatively corresponding to the positive or negative charge given to the droplet D by the microtube 7. This allows the micro-fluidic chip A to lead the droplets to one branch area arbitrarily selected from the branch areas 31, 32, and 33 to thereby sort the droplets.

(2-4-2) Movement Control Regarding Two-Dimensional Directions

Although the above description relates to the control of the movement direction of the droplet D regarding one-dimensional directions (the Y-axis positive and negative directions), it is also possible to carry out the movement direction control regarding two-dimensional directions (the Y-axis and Z-axis positive and negative directions). In the case of the movement, control regarding two-dimensional directions, plural electrodes are provided toward the cavity 2 also along the Z-axis direction.

Figure 8:
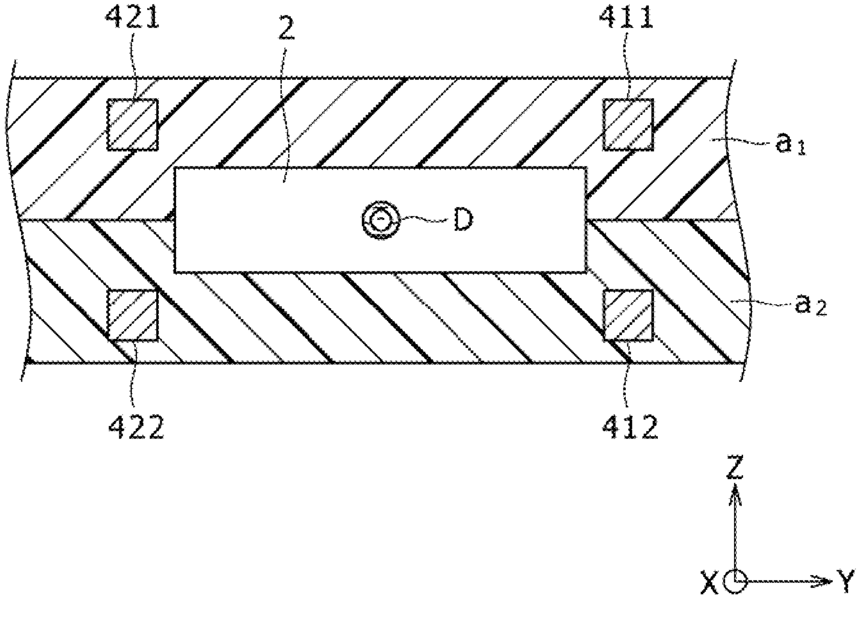
FIG. 8 is a schematic diagram showing the provision positions of electrodes for earning out control of the movement direction of droplets in the cavity 2 regarding two-dimensional directions.

FIG. 8 is a schematic diagram showing the provision positions of the electrodes for carrying out the control of the movement direction of droplets in the cavity 2 regarding two-dimensional directions.

In this modification example of the micro-fluidic chip A, four electrodes 411, 412, 421, and 422 are provided toward the cavity 2 at positions corresponding to four corners of the cavity 2. By charging these electrodes positively or negatively, the movement direction of droplets given a charge is controlled regarding both of the Y-axis positive and negative directions and the Z-axis positive and negative directions based on electrical attractive force and repulsive force.

Figure 9:
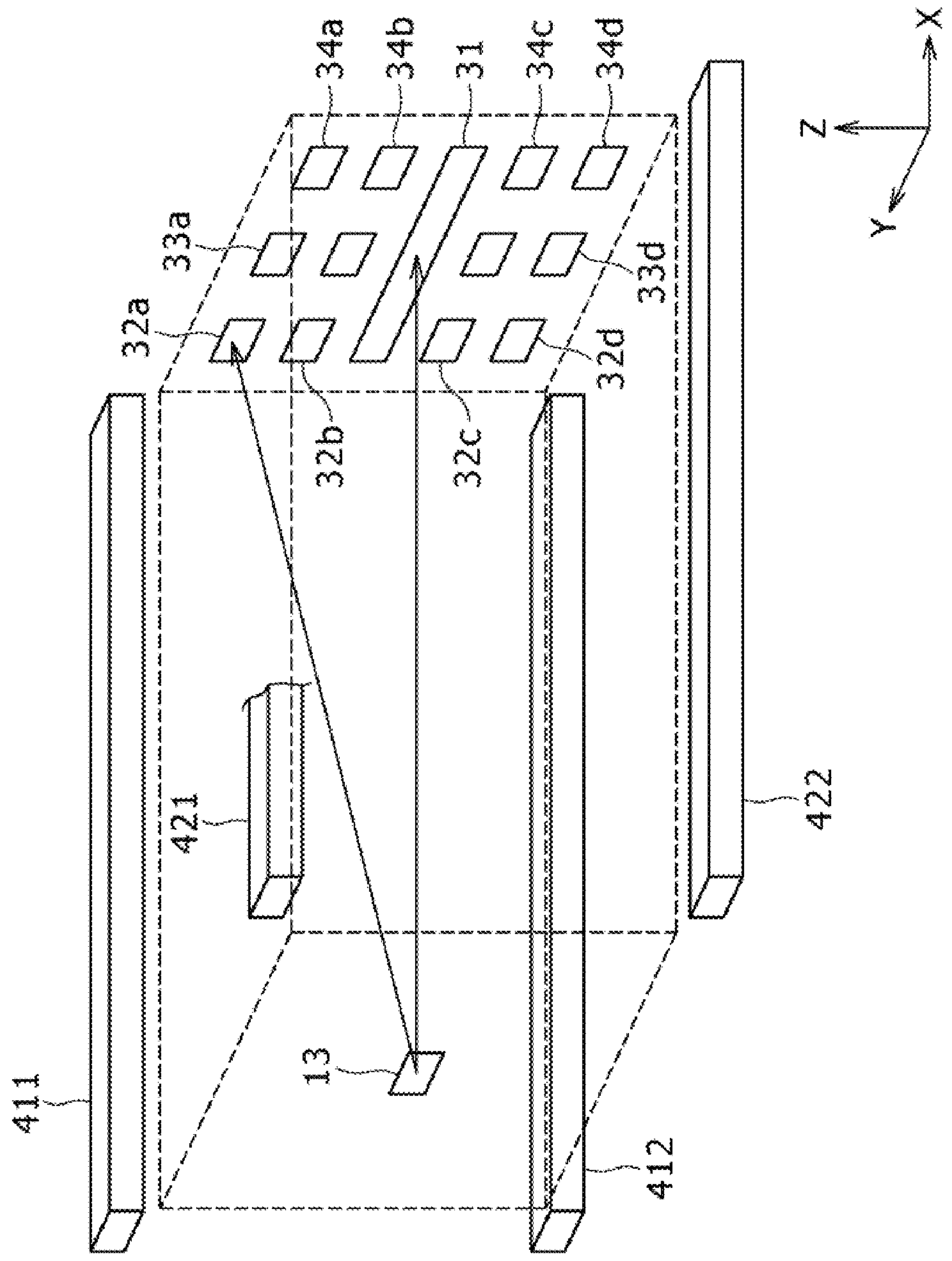
FIG. 9 is a schematic diagram showing the movement directions of a droplet whose movement direction is controlled regarding two-dimensional directions in the cavity.

FIG. 9 is a schematic diagram showing the movement directions of a droplet whose movement direction is controlled regarding two-dimensional directions in the cavity 2. In the diagram, the movement directions of the droplet are indicated by arrowheads, and the space in the cavity 2 is indicated by a dotted line.

In this modification example of the micro-fluidic chip A, thirteen branch areas 31, 32*a* to 32*d*, 33*a* to 33*d*, and 34*a* to 34*d* communicating with the cavity 2 are provided. The electrodes 411, 412, 421, and 422 are charged positively or negatively to thereby control the movement direction of the droplets sent into the cavity 2 regarding the Y-axis and Z-axis positive and negative directions, so that the droplets are selectively led to the respective branch areas. For example, the droplet that is to be led to the branch area 31 when no voltage is applied to the electrodes is selectively led to the branch area 32*a* by charging the respective electrodes under a predetermined condition.

In this modification example of the micro-fluidic chip A, a large number of branch areas communicating with the cavity 2 can be disposed on the YZ plane, and it is also possible to sort droplets by leading them to the respective branch areas one by one. Due to this feature, in the case of causing a liquid containing microparticles to pass through the micro-fluidic chip A and sorting the microparticles, the microparticles can be sorted into the respective branch areas one by one. As an application of this micro-fluidic chip A, it will be possible to sort cells into a large number of branch areas one by one for example.

3. Micro-Fluidic Chip 13 and Flow Sending Method in Micro-Fluidic Chip B

Figure 10:
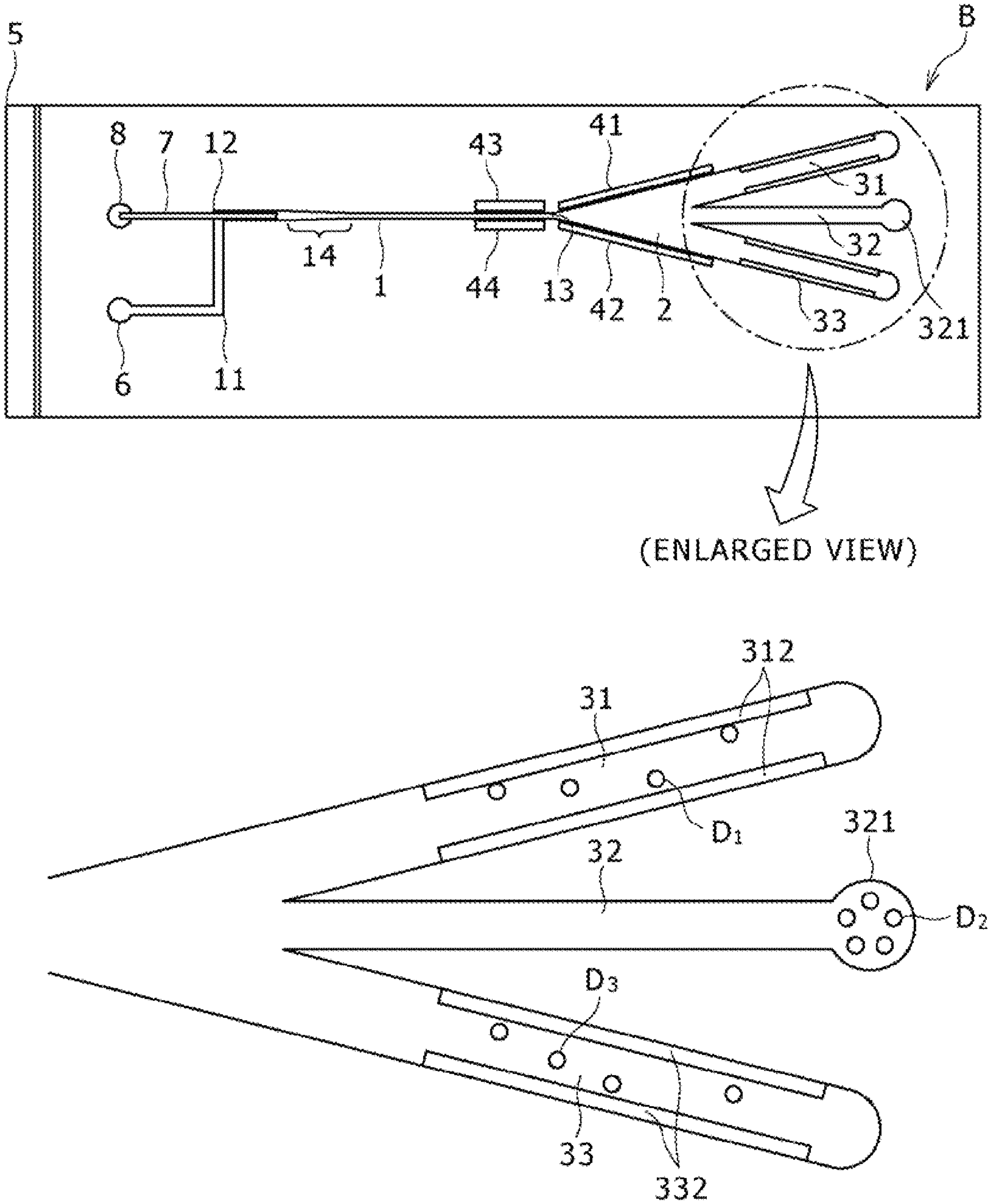
FIG. 10 is a simplified top view showing the structure of a micro-fluidic chip according to a second embodiment.

FIG. 10 is a simplified top view showing the structure of a micro-fluidic chip according to a second embodiment of the present application. The micro-fluidic chip indicated by symbol B in the diagram is favorably used to sort microparticles by causing a liquid containing the microparticles to pass through this micro-fluidic chip, as with the micro-fluidic chip A. Regarding the structure of the micro-fluidic chip B, different points from the micro-fluidic chip A will be described below.

(3-1) Piezoelectric Element

The micro-fluidic chip B is so configured that the liquid passing through the flow channel 1 is turned to droplets by a piezoelectric element 5 provided along one side of the chip and is sent to the cavity 2. Specifically, the liquid discharged from the communicating port 13 of the flow channel 1 is turned to droplets by applying a pulse voltage to the piezoelectric element 5 and vibrating it to thereby vibrate the whole of the micro-fluidic chip B.

In the above-described micro-fluidic chip A, pressure is applied to the liquid passing through the flow channel 1 by the piezoelectric element 5 to thereby turn the liquid to droplets, and therefore the piezoelectric element 5 may need to be provided toward the flow channel 1 (see FIG. 4). In contrast, in the micro-fluidic chip B, the liquid is turned to droplets by vibrating the whole of the micro-fluidic chip B, and therefore the piezoelectric element 5 may be provided at any position, on the chip. Thus, in the case of the micro-fluidic chip B, time and effort for fabricating the piezoelectric element 5 inside the chip can be saved.

Moreover, for the micro-fluidic chip B, the piezoelectric element does not have to be provided on the chip itself as long as the piezoelectric element is provided on the device in which the chip is incorporated. In this case, the piezoelectric element, provided on the device is made contact with a part of the micro-fluidic chip B in the state in which the micro-fluidic chip B is incorporated in the device. This makes it possible to conduct the vibration of the piezoelectric element on the device to the micro-fluidic chip B incorporated in the device to thereby turn the liquid to droplets.

(3-2) Branch Areas

In the micro-fluidic chip B, thin tubes for bringing out led droplets to the outside of the chip are provided in branch areas. In the enlarged view of FIG. 10, the thin tubes indicated by numerals 312 and 332 are tubes formed of any of a metal, glass, ceramics, various kinds of plastic (PP, PC, COP, PDMS), and so on, and capture droplets led to the branch areas 31 and 33 in the internal hollow of the tubes. This diagram shows a structure in which droplets $D_1$, $D_2$, and $D_3$ are led to the branch areas 31, 32, and 33, respectively, and the droplets $D_1$ and $D_3$ are brought out to the outside of the chip. The droplets $D_2$ led to the branch area 32 are discharged from the outlet 321 to the outside of the micro-fluidic chip B.

In sorting of microparticles by use of the micro-fluidic chip B, a sample liquid containing microparticles is introduced from the sample liquid inlet 8 and a sheath liquid is introduced from the sheath liquid inlet 6, to thereby send the flow of droplets containing the microparticles to the cavity 2. Furthermore, the movement direction of the droplets is controlled in the cavity 2, to thereby lead the microparticles to any of the branch areas 31, 32, and 33 for the sorting thereof, with the microparticles contained in the droplets.

With the micro-fluidic chip B, the microparticles in the droplets $D_1$ and $D_3$ sorted into the branch areas 31 and 33 in this manner can be collected by bringing out the thin tubes 312 and 332 including these droplets to the outside of the chip. For example, in sorting of cells as the microparticles, cell groups contained in the droplets $D_1$ and $D_3$ sorted into the branch areas 31 and 33, respectively, are brought out, with these droplets included in the thin tubes 312 and 332, and these thin tubes 312 and 332 are entirely put into a cell culture fluid. This allows culture of the respective cell groups.

The micro-fluidic chip B can collect microparticles, such as cells or microbeads, sorted into the respective branch areas without mixing of the microparticles with each other because the micro-fluidic chip B is so configured that droplets led to the branch area can be brought out to the outside of the chip with these droplets included in the thin tube. Furthermore, the micro-fluidic chip B can prevent contamination by bacteria, impurities, and so on in the collection of microparticles.

In sorting of cells as microparticles in the micro-fluidic chip B, it is also effective to fill the branch areas 31 and 33 with a gel for cell culture in order to make it easier to bring out the cells sorted in the branch areas from the micro-fluidic chip B and perform subsequent cell culture.

Filling the branch areas with a gel for cell culture makes it possible to capture and hold cells led from the cavity 2 in the gel. This can prevent the sorted cells from being damaged due to contact and collision with the inner wall of the branch area and dying due to drying in the branch area. Furthermore, it is also possible to collect the sorted cells by bringing out the gel containing the cells to the outside of the chip and perform cell culture.

As the gel for cell culture, a publicly-known gel such as a collagen gel or an elastin gel can be used. Alternatively, a substance prepared by blending saline with any of these gels at adequate concentration can be used. Furthermore, it is also possible to employ a configuration in which the above-described thin tube is provided in the branch area and this thin tube is filled with the gel for cell culture. This allows collection of the thin tube from the micro-fluidic chip, which makes it possible to effectively collect sorted cells in a short time in the cell collection.

4. Micro-Fluidic Chip C and Flow Sending Method in Micro-Fluidic Chip C

Figure 11:
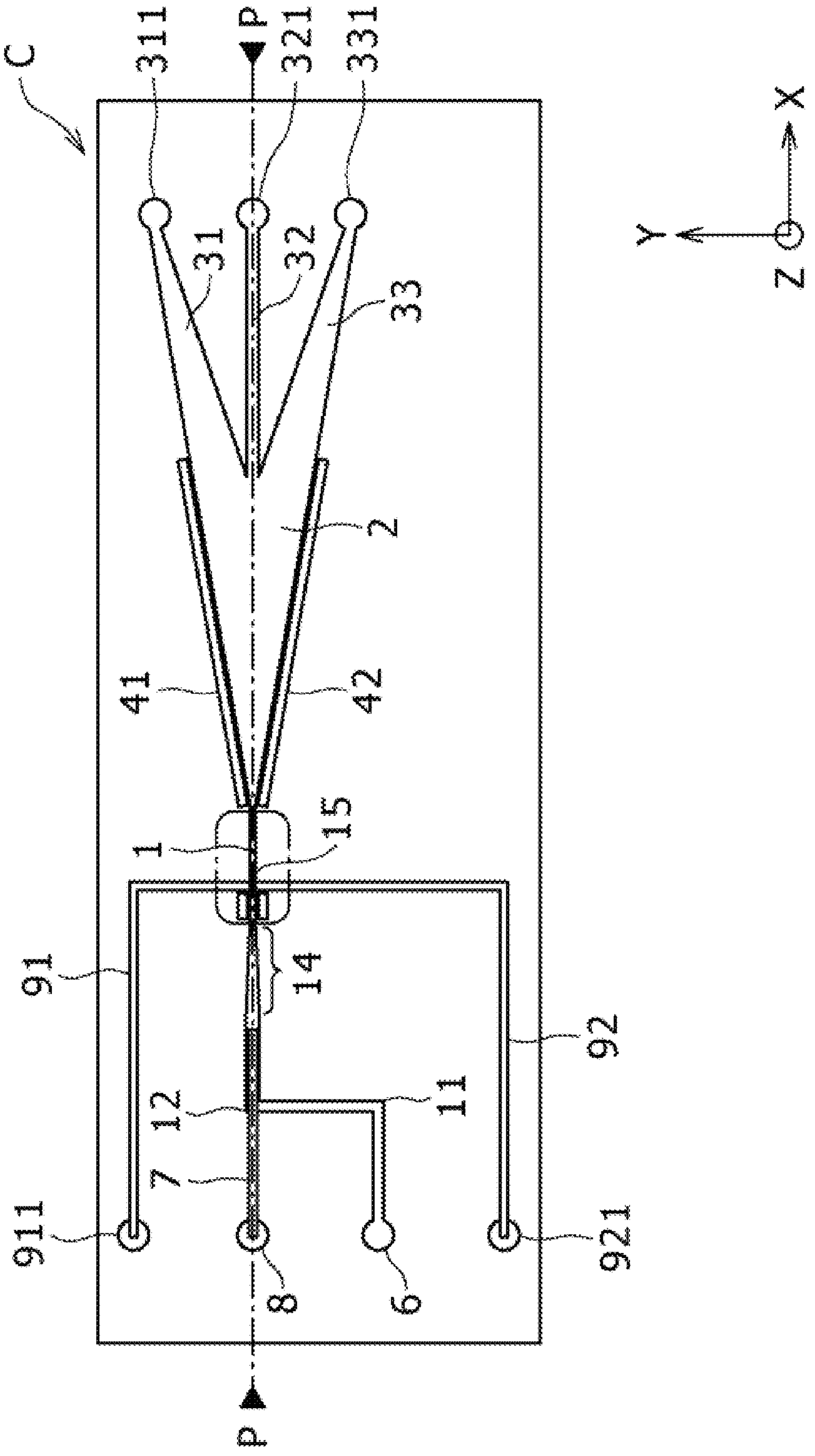
FIG. 11 is a simplified top view showing the structure of a micro-fluidic chip according to a third embodiment.

FIG. 11 is a simplified top view showing the structure of a micro-fluidic chip according to a third embodiment of the present application. The micro-fluidic chip indicated by symbol C in the diagram is favorably used to sort microparticles by causing a liquid containing the microparticles to pass through this micro-fluidic chip, as with the micro-fluidic chips A and B. Regarding the structure of the micro-fluidic chip C, different points from the micro-fluidic chip A will be described below.

(4-1) Fluid Inlet

In FIG. 11, numerals 91 and 92 denote fluid inlets for introducing a fluid that is a gas or an insulating liquid into the flow channel 1. The fluid inlets 91 and 92 communicate with the flow channel 1 at one end of each thereof, and fluid inlets 911 and 921 to which a fluid is supplied are provided at the other ends. A gas or an insulating liquid (hereinafter, referred to as the "gas or the like") supplied from the fluid Inlets 911 and 921 to the fluid inlets 91 and 92 by a pressurizing pump (not shown) is introduced into the flow channel 1 across a confluence indicated by numeral 15.

In the micro-fluidic chip C, the liquid passing through the flow channel 1 can be sent to the cavity 2 after being segmented and turned to droplets by the fluid introduced from the fluid inlets 91 and 92 to the confluence 15.

Figures 12A, 12B:
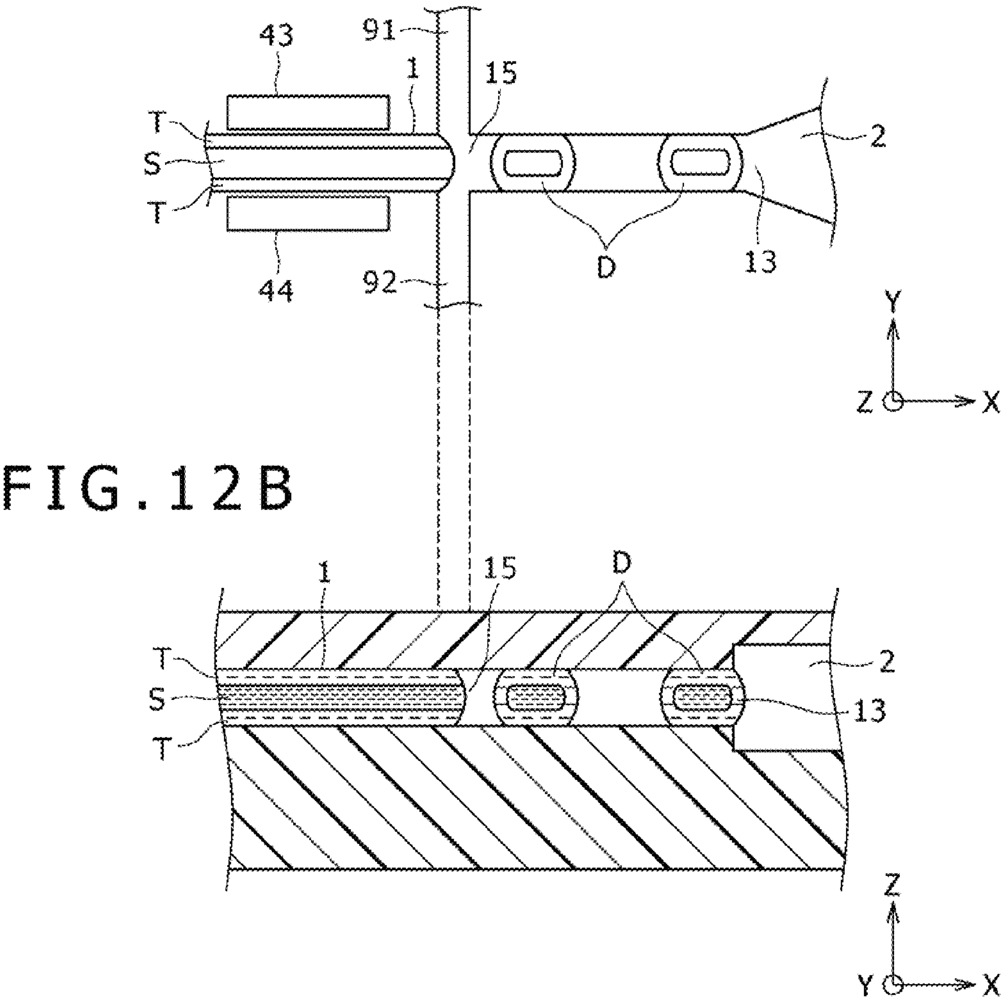
FIGS. 12A and 12B are schematic diagrams showing a confluence in an enlarged manner, FIG. 12A being a top view and FIG. 12B being a sectional view corresponding to the section along line P-P in FIG. 11.

FIG. 12 is a schematic diagram showing the confluence 15 in an enlarged manner. FIG. 12A is a top view and FIG. 12B is a sectional view corresponding to the section along line P-P in FIG. 11. This diagram shows the case in which the sheath liquid laminar flow T and the sample liquid laminar flow S sent to the confluence 15 via the microtube 7 and the narrowing part 14 are segmented and turned to droplets.

If the gas or the like is introduced from the fluid inlets 91 and 92 at predetermined timings for the sent sheath liquid laminar flow T and sample liquid laminar flow S, the sheath liquid laminar flow T and the sample liquid laminar flow S are segmented and turned to droplets at the confluence 15 by the introduced gas or the like as shown in the diagram. This allows the sheath liquid laminar flow T and the sample liquid laminar flow S to be turned to droplets in the flow channel 1 and ejected from the communicating port 13 into the cavity 2 (see FIG. 12 and the droplets D therein). The droplets D can include microparticles contained in the sample liquid as with the above description.

In the structure shown in FIGS. 11 and 12, one fluid inlet is provided at each of both the sides of the flow channel 1. However, it is sufficient that one fluid inlet is provided at least at one side of the flow channel 1. Furthermore, it is also possible that three or more fluid Inlets meet each other at the confluence 15.

Furthermore, although the fluid inlets meet the flow channel 1 at a right angle thereto in FIGS. 11 and 12, the confluence angle of the fluid Inlet, can be set to any angle.

It is preferable to perform water-repellent treatment processing for the surface of the partial portion of the flow channel 1 from the confluence 15 to the communicating port 13 in order to keep the droplet state of the sheath liquid and the sample liquid. If the droplets partially communicate with each other in the flow channel 1, the charge given to the droplets by the microtube 7 disappears and thus the control of the movement direction of the droplets in the cavity 2 possibly may become impossible or inaccurate.

Furthermore, in order to maintain the charge given to the respective droplets, it is also effective to give the electrical insulating property to the surface of the flow channel 1 to thereby prevent the movement of the charge between the droplets. The same advantage can be achieved also by employing an insulating liquid as the fluid introduced from the fluid inlet.

5. Method for Manufacturing Micro-Fluidic Chip (5-1) Shape Forming

Glass or any of various kinds of plastic (PP, PC, COP, PDMS) can be used as the material of the micro-fluidic chip. It is preferable to use a substance having water repellency as the material of the micro-fluidic chip. Using a substance having water repellency can prevent the disappearance of a charge due to communicating of droplets with each other, because of the water repellency of the cavity surface. In the case of performing optical analysis by use of the micro-fluidic chip, a substance that has optical transparency and low autofluorescence and involves few optical errors because of small wavelength dispersion is selected as the material of the micro-fluidic chip.

The shape forming of the flow channel 1 and so on provided on the micro-fluidic chip can be carried out by wet etching or dry etching of a glass substrate layer, or nanoimprinting, injection, molding, or mechanical processing of a plastic substrate layer. Furthermore, the substrate layer on which the shapes of the flow channel 1 and so on are formed is covered and sealed by a substrate layer composed of the same material or a different material. Thereby, the micro-fluidic chip can be formed.

A method for manufacturing a micro-fluidic chip will be concretely described below by taking the micro-fluidic chip A as an example. First, a mold having the shapes of the flow channel 1, the cavity 2, the branch areas 31, 32, and 33, and so on is set in injection molding apparatus for a substrate layer, and shape transfer is carried out.

Figure 13A:
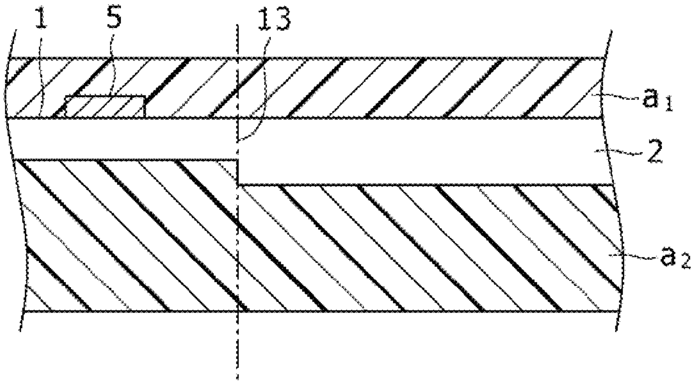
FIGS. 13A to 13D are schematic diagrams for explaining other preferred structures regarding the cavity and the communicating port.
Figure 13B:
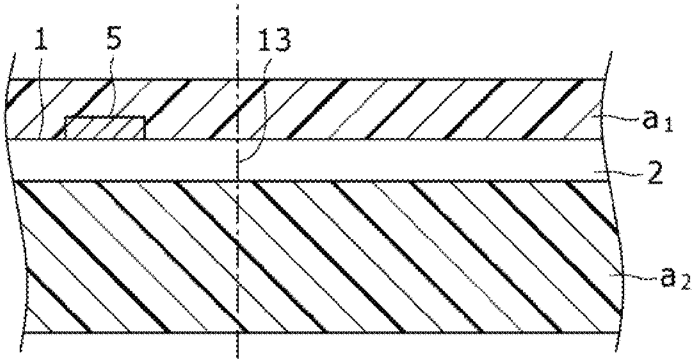

For the micro-fluidic chip A, as shown in FIG. 4, a recess for forming the cavity 2 is transferred to each of two substrate layers $a_1$ and $a_2$. The recess may be formed only in the substrate layer $a_2$ as shown in FIG. 13A, or may be formed only in the substrate layer $a_1$. Furthermore, as shown in FIG. 13B, the cavity 2 may be formed without forming a recess in the substrate layers $a_1$ and $a_2$ by equalizing the height of the cavity 2 in the Z-axis direction with that of the communicating port 13 of the flow channel 1. For simplification of the shape forming step, it is preferable to form the cavity 2 like that shown in FIG. 13A or 13B.

In the micro-fluidic chip A, the shape of the cavity 2 in top view is an isosceles triangle whose vertex is the communicating port 13 (see FIG. 1). The top-view shape of the cavity 2 may be e.g. a rectangle like that shown in FIG. 14A to be described later, and may be any shape as long as the cavity 2 can lead droplets to the branch areas with which the cavity 2 communicates.

The height of the cavity 2 in the Z-axis direction is set about ten to hundred times the size of the droplets to be Introduced therein. For example, if microparticles contained in the sample liquid as the analysis subject are hemocyte cells, the size of the droplets is about 30 to 50 μm, and therefore the height of the cavity 2 is about 300 μm to 5 mm.

If control of the movement direction of droplets regarding two-dimensional directions is intended as shown in FIGS. 8 and 9, the height of the cavity 2 in the Z-axis direction should be set larger. For this purpose, it is preferable to form the chip by stacking three or more substrate layers as described later.

Figure 13C:
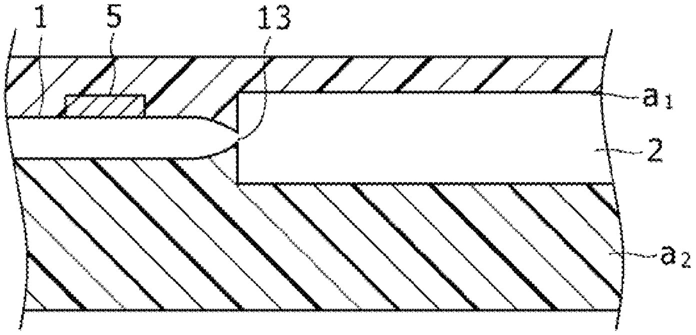

In the micro-fluidic chip A, the communicating port 13 to the cavity 2 is transferred by extending the flow channel 1 straight as shown in FIG. 4. The communicating port 13 of the flow channel 1 may be so formed as to be narrowed in a nozzle manner toward the cavity 2 as shown in FIG. 13C. This structure improves the drainage at the communicating port 13 and thus can promote the turning of the sheath liquid laminar flow T and the sample liquid laminar flow S to droplets by the piezoelectric element 5. The shape of the communicating port 13 is not limited to that shown in the diagram, but any of various shapes capable of promoting the turning of the liquids to droplets can be employed.

Figure 13D:
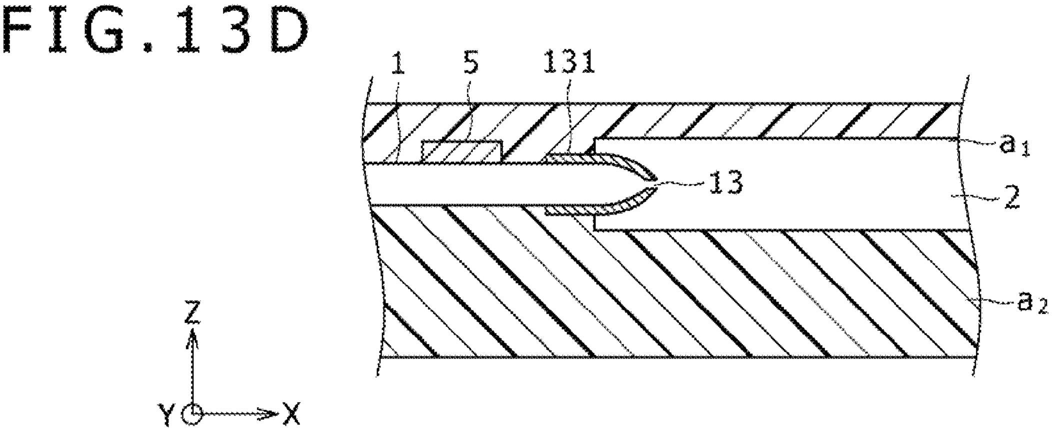

Furthermore, as shown in FIG. 13D, a small tube nozzle 131 formed of a metal, ceramic, resin, or another material may be disposed at the communicating port 13. The shape of this tube nozzle 131 is also not limited to that shown in the diagram but may be any shape capable of promoting the turning of the liquids to droplets. Furthermore, the drainage can be further improved by providing the tube nozzle 131 that protrudes from the flow channel 1 into the cavity 2 as shown in the diagram.

(5-2) Placement of Microtube and so on

Subsequently, the microtube 7, the electrodes 41 and 42, and the piezoelectric element 5 are disposed on the substrate layer after the shape forming thereof. The microtube 7 is fitted into a groove that is so formed between the sample liquid inlet 8 and the flow channel 1 as to interconnect them, and is so disposed that the sample liquid introduced into the sample liquid inlet 8 is sent into the flow channel 1 by the microtube 7 (see FIG. 1).

The electrodes 41 and 42 and the ground electrodes 43 and 44 are each fitted into a groove formed along the flow channel 1 or the cavity 2 as shown in FIGS. 5 and 6. The groove into which the electrode is fitted is so formed that a partition exists between the groove and the flow channel 1 or the cavity 2. The thickness of the partition (the length in the Y-axis direction in FIG. 5) is set to about 10 to 500 μm. Because the electrodes are not disposed directly on the inner wall of the cavity 2 but disposed with the intermediary of the partition, water-repellent treatment and electrical insulating treatment for the surface of the cavity 2 can be performed easily.

Figure 14A:
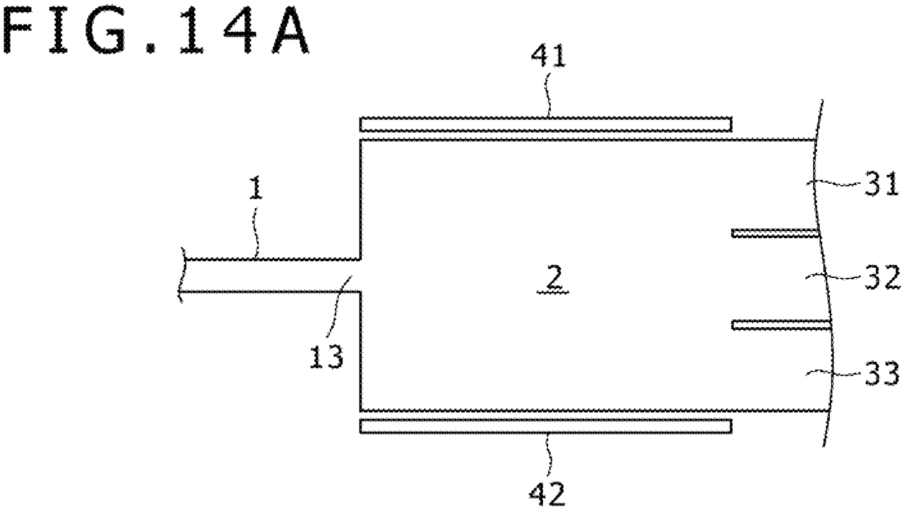
FIGS. 14A to 14C are schematic diagrams for explaining other preferred structures regarding the cavity and electrodes.

In the micro-fluidic chip A, the electrodes 41 and 42 are disposed in a "V" character manner in top view as shown in FIG. 1. For example, if the shape of the cavity 2 in top view is a rectangle, it is also possible that both the electrodes for controlling the movement direction of droplets in the cavity 2 are opposed to each other in parallel as shown in FIG. 14A.

Figure 14B:
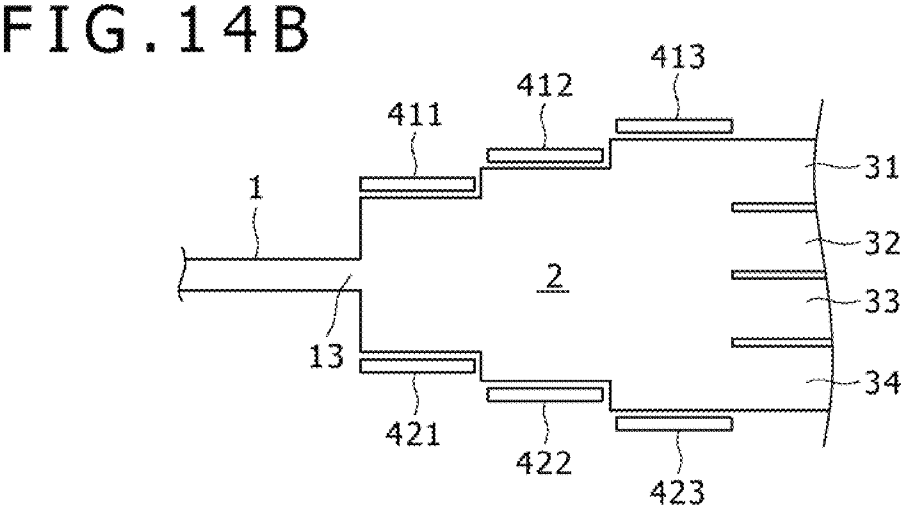

For the control of the movement direction of droplets, one or more electrodes should be disposed at least at one side of the cavity 2. However, obviously it is also possible to provide three or more electrodes accordingly. For example, as shown in FIG. 14B, plural electrodes 411, 412, and 413 (or electrodes 421, 422, and 423) may be disposed on each of both the sides of the cavity 2. In FIG. 14B, the width of the cavity 2 in the Y-axis direction is increased in a stepwise manner in the X-axis positive direction. In addition, the electrodes 411, 412, and 413 and the electrodes 421, 422, and 423 are so disposed that the distance between the electrodes opposed to each other gradually increases. In FIG. 14B, the number of branch areas communicating with the cavity 2 is four (branch areas 31 to 34).

Figure 14C:
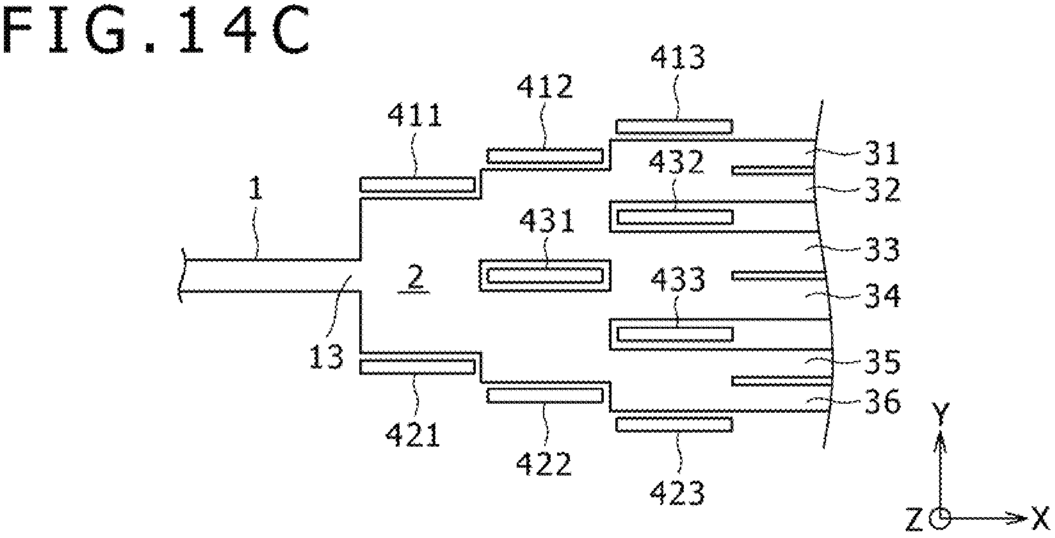

The electrodes may be disposed in the internal area of the cavity 2 as shown in FIG. 14C. In FIG. 14C, electrodes 431, 432, and 433 are disposed in the cavity 2, and total nine electrodes, including the electrodes disposed on the sides of the cavity 2, are disposed. The electrodes 431, 432, and 433 are so disposed that a partition exists between the electrode and the hollow of the cavity 2. By disposing the electrodes also in the internal area of the cavity 2 in this manner, droplets can be accurately led to one selected branch area through exhaustive control of the movement direction of the droplets, even when a large number of branch areas (six branch areas, in the diagram) are provided. The number of branch areas communicating with the cavity 2 is not particularly limited as long as it is equal to or larger than two.

The piezoelectric element 5 is disposed at such a position, upstream of the communicating port 13 of the flow channel 1, that pressure is applied to the liquid passing through the flow channel 1 due to the vibration of the piezoelectric element 5 in response to application of a pulse voltage thereto as described with FIG. 4.

(5-3) Joining

After the placement of the microtube 7, the electrodes 41 and 42, and the piezoelectric element 5, the substrate layers $a_1$ and $a_2$ are joined to each other. For the joining of the substrate layers, a publicly-known method can be used accordingly. For example, any of the following methods can be used accordingly: heat fusion, an adhesive, anodic bonding, bonding by use of an adhesive sheet, plasma-activated bonding, and ultrasonic bonding.

In the joining of the substrate layers $a_1$ and $a_2$, the groove into which the microtube 7 is fitted is sealed by an adhesive. As this adhesive, the same adhesive as that for fixing the microtube 7 to the groove can be used. The sealing of the groove allows the sample liquid inlet 8 and the flow channel 1 to be connected to each other via the microtube 7.

The micro-fluidic chip A obtained by the above-described method can be used irrespective of which of the front and back surfaces thereof is oriented upward. Therefore, obviously it is also possible to use the micro-fluidic chip A shown in FIG. 4 in such a way that the substrate layer $a_2$ is on the upper surface side and the substrate layer $a_1$ is on the lower surface side. In the state of FIG. 4 the narrowing part 14 is so formed that the flow channel bottom surface thereof is an inclined surface whose height gradually increases in the direction from the upstream side toward the downstream side. However, if the micro-fluidic chip A is turned upside down, the flow channel top surface of the narrowing part 14 can be regarded as an inclined surface whose height in the flow channel depth direction decreases in the direction from the upstream side toward the downstream side. In this ease, the laminar flow widths of the sheath liquid laminar flow and the sample liquid laminar flow sent to the narrowing part 14 are narrowed in such a way that these laminar flows are deflected toward the lower surface side of the micro-fluidic chip A.

(5-4) Stacking of Substrate Layers for Movement Control Regarding Two-Dimensional Directions If control of the movement direction of droplets regarding two-dimensional directions is intended as described with FIGS. 8 and 9, it is preferable that the height of the cavity 2 in the Z-axis direction be set large by stacking plural substrate layers.

Figure 15A:
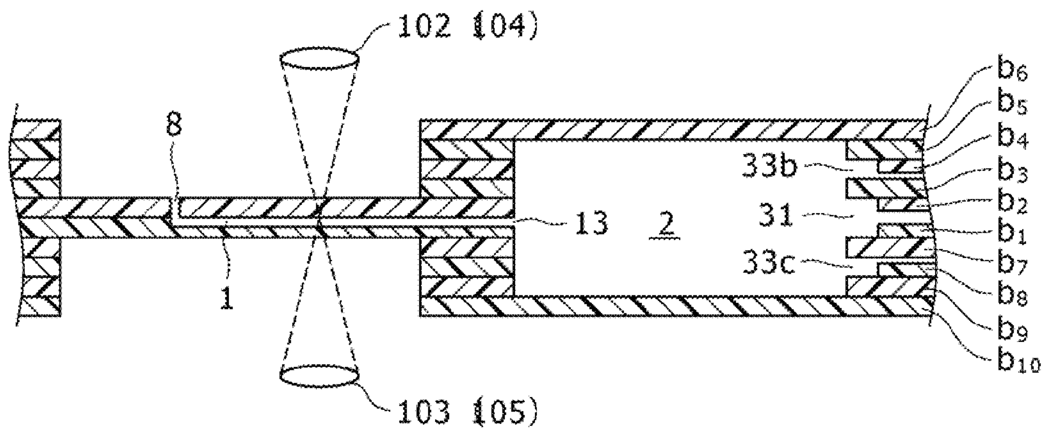
FIGS. 15A and 15B are a schematic sectional view showing a section of a modification example of a micro-fluidic chip and a simplified perspective view schematically showing substrate layers for forming this modification example, respectively.
Figure 15B:
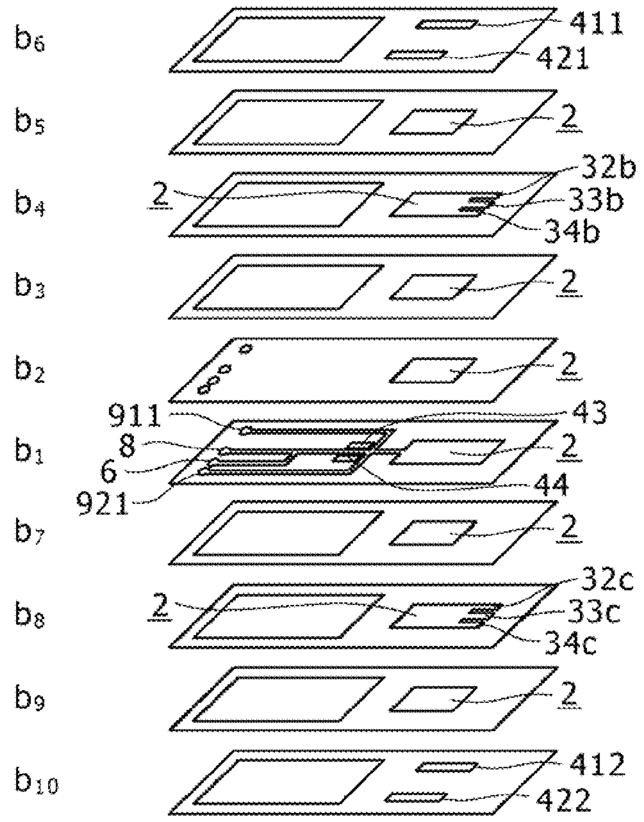

FIG. 15A is a schematic sectional view showing a modification example of the micro-fluidic chip C in which the height of the cavity 2 in the Z-axis direction is set large for movement control regarding two-dimensional directions. FIG. 15B is a simplified perspective view schematically showing the substrate layers for forming this modification example.

As shown in FIG. 15A, in this modification example of the micro-fluidic chip C, the height of the cavity 2 is set large by stacking ten substrate layers $b_1$ to $b_{10}$. In the diagram, numeral 13 denotes a communicating port of the flow channel 1 to the cavity 2, and numerals 31, 33*b*, and 33*c* denote branch areas. Furthermore, numerals 102 and 103 denote an optical detection system (an irradiator 102 and a detector 103) provided In a liquid analysis device to be described later (see FIG. 16).

To the substrate layer $b_1$, a recess to serve as the flow channel and fluid inlets is transferred (see FIG. 15B). This recess corresponds to the shapes of the sheath liquid inlet 6, the sample liquid inlet 8, the fluid inlets 911 and 921, and so on. Furthermore, grooves in which the ground electrodes 43 and 44 are to be disposed are formed in this substrate layer $b_1$. After the ground electrodes 43 and 44 are disposed in the grooves, the substrate layer $b_2$ is stacked on the substrate layer $b_1$. In the substrate layer $b_2$, an opening is formed at each of the positions corresponding to the sheath liquid inlet 6, the sample liquid inlet 8, the fluid inlets 911, and 921, and the cavity 2.

Subsequently, over the substrate layer $b_2$, three substrate layers $b_3$ to $b_5$ for forming the branch areas 32*b*, 33*b*, and 34*b* (see FIG. 9) are sequentially stacked. Similarly, below the substrate layer $b_1$, the substrate layers $b_7$ to $b_9$ for forming the branch areas 32*c*, 33*c*, and 34*c* (see FIG. 9) are stacked. Three substrate layers as the substrate layers for forming the branch areas are put together into one set, and plural sets are stacked. Thereby, a large number of branch areas communicating with the cavity 2 can be formed.

At last, the substrate layers $b_6$ and $b_{10}$ having grooves in which the electrodes 411 and 421 and the electrodes 412 and 422 are to be disposed are stacked as the uppermost layer and the lowermost layer, and these electrodes are disposed.

By thus stacking ten substrate layers $b_1$ to $b_{10}$, the height of the cavity 2 can be set large and the size of the free space in the cavity 2 can be set large. This makes it possible to effectively carry out movement control of droplets regarding two-dimensional directions by the electrodes 411, 421, 412, and 422 like that described with FIG. 9. Furthermore, also when control of the movement direction of droplets is carried out regarding one-dimensional directions, setting the size of the free space in the cavity 2 large makes it possible to control the movement direction more surely by preventing the droplets from coming into contact with and adhering to the upper surface and lower surface of the cavity 2.

Furthermore, it is preferable to provide, in each of the stacked substrate layers except the substrate layers $b_1$ and $b_2$ for forming the flow channel 1, a window (opening) at the position corresponding to the part of laser light irradiation by the optical detection system (the irradiator 102 and the detector 103). Due to this structure, the chip thickness at the part of the laser light irradiation can be set small in the micro-fluidic chip obtained by stacking the respective substrate layers. Thus, reflection, attenuation, scattering, and so on of the laser light can be suppressed compared with the case in which the thickness of the entire chip is set large. Furthermore, the height of the cavity 2 can be arbitrarily adjusted, with the chip thickness of the part of the laser light irradiation kept constant. Thus, even when plural chips different from each other in the height of the cavity 2 are used for analysis, optical characteristics of the optical detection system on the device side do not need to be changed.

6. Liquid Analysis Device

Figure 16:
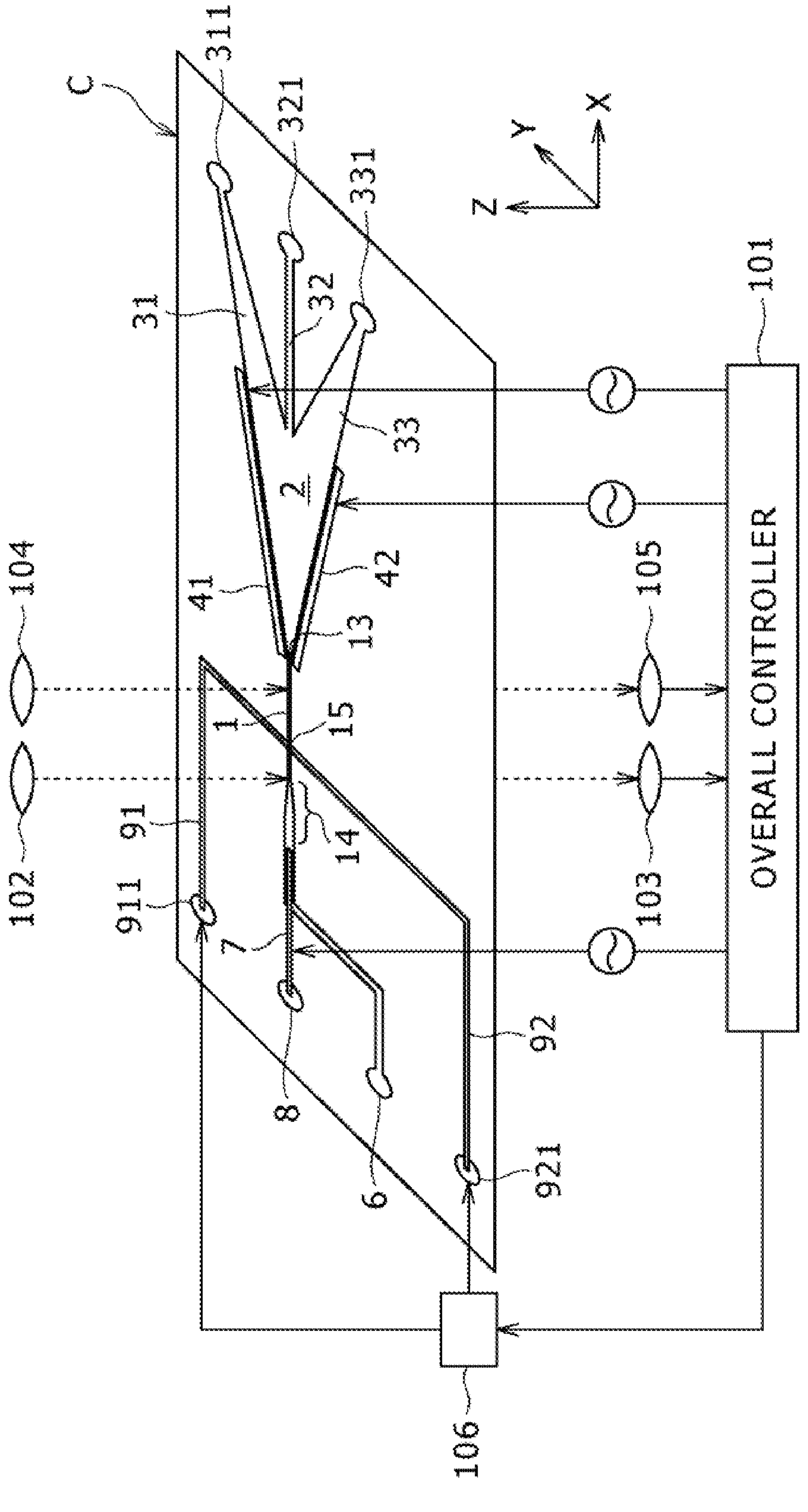
FIG. 16 is a schematic diagram for explaining the configuration of a liquid analysis device according to an embodiment.

FIG. 16 is a schematic diagram for explaining the configuration of a liquid analysis device according to an embodiment of the present. The present application contains subject matter related to that disclosed in Japanese Priority Patent Application JP 2008-156118 filed in the Japan Patent Office on Jun. 16, 2008 and Japanese Priority Patent Application JP 2008-231248 filed in the Japan Patent Office on Sep. 9, 2008, the entire contents of which are hereby incorporated by reference. This liquid analysis device is favorably used as a microparticle sorting device that analyzes characteristics of microparticles and carries out fractionation of the microparticles based on the analysis result. The respective components in this liquid analysis device (microparticle sorting device) will be described below by taking as an example a device in which the above-described micro-fluidic chip C is incorporated.

The microparticle sorting device shown in FIG. 16 includes an optical detection system (the irradiator 102 and the detector 103) for detecting microparticles passing through the flow channel 1 on the upstream side of the confluence 15 in the micro-fluidic chip C, and an optical detection system (an irradiator 104 and a detector 105) for determining an optical characteristic of the microparticle on the downstream side of the confluence 15. In addition, the microparticle sorting device includes a pressurizing pump 106 for supplying a gas or the like to the fluid inlets 911 and 921 in the micro-fluidic chip C. In the diagram, numeral 101 denotes an overall controller for controlling these optical detection systems, the pressurizing pump, and the voltages applied to the microtube 7 and the electrodes 41 and 42

Furthermore, the microparticle sorting device includes a liquid supply unit (not shown) so that a sheath liquid laminar flow may be supplied from the sheath liquid inlet 6 in the micro-fluidic chip C and a sample liquid laminar flow may be supplied from the sample liquid inlet 8. The sheath liquid and the sample liquid supplied to the micro-fluidic chip C are sent to the confluence 15 in such a way that the sample liquid laminar flow is surrounded by the sheath liquid laminar flow and the laminar flow widths of these laminar flows are narrowed, by the microtube 7 and the narrowing part 14 (see FIG. 12).

(6-1) Detection of Microparticles

The microparticle sorting device includes the optical detection system for optically detecting the microparticles contained in the sample liquid laminar flow on the upstream side of the confluence 15. This optical detection system can be configured similarly to a microparticle analysis system employing a related-art micro-fluidic chip. Specifically, it is configured with the irradiator 102 composed of a laser light source, a condensing lens for focusing laser light on a microparticle and irradiating the microparticle with the laser light, a dichroic mirror, a bandpass filter, and so on, and the detector 103 that detects light generated from the microparticle due to the laser light irradiation. The detector is formed of e.g. a photo multiplier tube (PMT) or an area imaging element such as a CCD or a CMOS element, In the micro-fluidic chip C, the sheath liquid laminar flow and the sample liquid laminar flow can be sent to the part of the laser light irradiation by the irradiator 102 after the laminar flow widths thereof are narrowed by the narrowing part 14. Thus, the focus position of the laser light from the irradiator 102 can be exhaustively matched with the flow sending position of the microparticles in the flow channel 1. This makes it possible to irradiate the microparticle with the laser light with high accuracy and detect the microparticle with high sensitivity.

The light that is generated, from the microparticles and detected by the detector 103 is converted into an electric signal and output to the overall controller 101. The light detected by the detector 103 may be scattered light or fluorescence, such as forward scattered light, side scattered light, Rayleigh scattered light, or Mie scattered light of the microparticle.

The overall controller 101 detects the microparticles in the sample liquid laminar flow sent in the flow channel 1 based on this electric signal. Furthermore, the overall controller 101 controls the pressuring pump 106 at predetermined timings to thereby introduce a gas or the like from the fluid inlets 911 and 921 and the fluid inlets 91 and 92 to the confluence 15 and segment the sheath liquid laminar flow and the sample liquid laminar flow so as to turn the liquids to droplets (see FIG. 12).

As for the timing of the fluid introduction to the confluence 15, the gas or the like is introduced after a certain time every time one microparticle is detected based on the electric signal from the detector 103, for example. The time period from the microparticle detection to the fluid introduction is defined depending on the distance between the confluence 15 and the part of the laser light irradiation by the irradiator 102 and the liquid sending speed of the sample liquid in the flow channel 1. By introducing the gas or the like to the confluence 15 every time one microparticle is detected with this time period accordingly adjusted, the sheath liquid laminar flow and the sample liquid laminar flow can be segmented and turned to droplets for every one microparticle.

In this case, one microparticle is contained in each droplet. However, the number of microparticles contained in each droplet can be set to any number by accordingly adjusting the timing of the fluid introduction to the confluence 15. That is, if the gas or the like is introduced every time a predetermined number of microparticles are detected, droplets can be made in units of the predetermined number of microparticles.

In the above-described case, detection of microparticles contained in the sample liquid laminar flow is carried out by the optical detection system. However, the scheme for the microparticle detection is not limited to an optical scheme but the microparticle detection can be carried out also by an electric or magnetic scheme. In the case of electrically or magnetically detecting microparticles, a microelectrode is disposed upstream of the confluence 15. Furthermore, e.g. any of the resistance, the capacitance, the inductance, the impedance, and the value of change in an electric field between electrodes is measured. Alternatively, e.g. any of magnetization relating to the microparticles and a magnetic field change is measured. By outputting the measurement result as an electric signal, the microparticle detection by the overall controller 101 is carried out based on this signal.

In the micro-fluidic chip C, also when microparticles are electrically or magnetically detected, the microparticles can be detected with high sensitivity by exhaustively matching the measurement position of the disposed microelectrode with the flow sending position of the microparticles.

If the microparticles are magnetic, it will also be possible to employ magnetic poles as the electrodes 41 and 42 of the micro-fluidic chip C particularly to thereby control the flow sending direction of microparticles in the cavity 2 based on magnetic force.

(6-2) Determination of Optical Characteristic of Microparticle

The microparticle sorting device also includes the optical detection system composed of the irradiator 104 and the detector 105 downstream of the confluence 15. This optical detection system is to determine a characteristic of a microparticle. However, the configurations themselves of the irradiator 104 and the detector 105 may be the same as those of the above-described irradiator 102 and detector 103.

The irradiator 104 irradiates a microparticle contained in a droplet formed at the confluence 15 with laser light. The light generated from the microparticle due to this light irradiation is detected by the detector 105. The light detected by the detector 105 may be scattered light or fluorescence, such, as forward scattered light, side scattered light, Rayleigh scattered light, or Mie scattered light of the microparticle. The light is converted into an electric signal and output to the overall controller 101.

Based on the input electric signal, the overall controller 101 determines an optical characteristic of the microparticle by employing, as a parameter, the scattered light or fluorescence, such as toward scattered light, side scattered light, Rayleigh scattered light, or Mie scattered light of the microparticle. The light employed as the parameter for the determination of an optical characteristic differs depending on the microparticle as the determination target and the purpose of the sorting. Specifically, forward scattered light is employed to determine the size of the microparticle, side scattered light is employed to determine the structure, and fluorescence is employed to determine whether or not a fluorescent substance as a label on the microparticle is present.

The overall controller 101 analyzes the light detected based on the parameter and makes a determination as to whether or not the microparticle has the predetermined optical characteristic.

In the above-described case, a characteristic of the microparticle contained in the droplet is optically determined. However, it is also possible to determine a characteristic of the microparticle electrically or magnetically. In the case of measuring electrical property and magnetic property of a microparticle, a microelectrode is disposed downstream of the confluence 15. Furthermore, e.g. any of the resistance, the capacitance, the inductance, the impedance, and the value of change in an electric field between electrodes is measured. Alternatively, e.g. any of magnetization relating to the microparticle and a magnetic field change is measured. It is also possible to simultaneously measure two or more characteristics of these characteristics. For example, in the case of measuring a magnetic bead or the like labeled by a fluorescent dye as the microparticle, an optical characteristic and a magnetic characteristic are simultaneously measured.

(6-3) Sorting of Microparticles

The overall controller 101 controls the voltages applied to the microtube 7 and the electrodes 41 and 42 based on the result of the determination of the characteristic of the microparticles and leads the droplets containing the microparticles having the predetermined characteristic to any of the branch areas 31, 32, and 33, to thereby carry out fractionation and sorting of the microparticles.

For example, if it is determined that a microparticle contained in a droplet has the predetermined characteristic and a positive charge is given to the droplet containing the microparticle by the microtube 7, the electrode 41 is negatively charged and the electrode 42 is positively charged. This changes the movement direction of the droplet in the cavity 2 to a direction toward the branch area 31, and sorts the microparticle having the predetermined characteristic into the branch area 31. The sorted droplet and microparticle can be collected from the outlet 311.

In contrast, if it is determined that a microparticle contained in a droplet does not have the predetermined characteristic, the electrode 41 is positively charged and the electrode 42 is negatively charged. Thereby, the droplet is led to the branch area 33 and the microparticle is discharged from the outlet 331. Alternatively, the droplet may be led to the branch area 32 and the outlet 321 without charging the electrodes 41 and 42.

In this manner, the microparticle sorting device according to the embodiment of the present application accordingly switches the polarity of the charge given to a droplet containing a microparticle and the polarities of the voltages applied to the electrodes between the positive and negative polarities depending on the result of the determination of a characteristic of the microparticle. Thereby, the microparticle sorting device can lead and son the microparticle to one branch area that is arbitrarily selected.

In the above-described microparticle sorting device, the optical detection system (the irradiator 102 and the detector 103) for detecting microparticles in the sample liquid laminar flow passing through the flow channel 1 for turning the liquid to droplets and the optical detection system (the irradiator 104 and the detector 105) for determining an optical characteristic of the microparticle contained in the droplet are separately provided upstream and downstream of the confluence 15. However, it is also possible to form them integrally with each other.

For example, one optical detection system (e.g. the irradiator 102 and the detector 103) can carry out both microparticle detection and optical characteristic determination if the micro-fluidic chip A or B, in which a liquid is turned to droplets by a piezoelectric element, is incorporated in the microparticle sorting device according to the embodiment of the present application. In this ease, the overall controller 101 detects microparticles and simultaneously determines an optical characteristic thereof. Based on the determination result, the overall controller 101 switches the voltages applied to the microtube 7 and the electrodes 41 and 42 (see FIG. 1). For example, if it is determined that a microparticle has the predetermined characteristic, the overall controller 101 applies positive voltage to the microtube 7 at the moment when this microparticle is packed into a droplet at the communicating port 13 and ejected by the piezoelectric element 5. Simultaneously, the overall controller 101 applies positive voltage and negative voltage to the electrode 41 and the electrode 42, respectively, to thereby lead and sort the droplet containing the microparticle into the branch area 33.

It should be understood that, various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A micro-fluidic chip comprising:

a hollow area into which a charged droplet is introduced; and an electrode configured to be provided toward the hollow area; wherein movement direction of a droplet in the hollow area is controlled based on electric force acting between a charge given to the droplet and the electrode;

a plurality of branch areas configured to communicate with the hollow area; wherein the droplet is led to one branch area that is arbitrarily selected by controlling the movement direction of the droplet in the hollow area;

a flow channel configured to send a liquid into the hollow area; and a fluid inlet configured to meet the flow channel at least from one side of the flow channel and introduce a fluid that is a gas or an insulating liquid into the flow channel; wherein a liquid passing through the flow channel is segmented to be turned to a droplet by a fluid introduced from the fluid inlet and is sent into the hollow area;

a microtube configured to introduce a first liquid into a laminar flow of a second liquid passing through the flow channel; wherein the first liquid and the second liquid are sent to the communicating port of the flow channel or a confluence of the fluid inlet in such a way that a laminar flow of the first liquid introduced from the microtube is surrounded by the laminar flow of the second liquid;

the flow channel has a narrowing part that is so formed that area of a section of the narrowing part perpendicular to liquid sending direction gradually decreases; and the first liquid and the second liquid are so sent that laminar flow widths of the laminar flows of the first liquid and the second liquid are narrowed in the narrowing part.

2. The micro-fluidic chip according to claim 1, further comprising:

a flow channel configured to send a liquid into the hollow area; and a piezoelectric element configured to turn a liquid to a droplet at a communicating port of the flow channel to the hollow area.

3. The micro-fluidic chip according to claim 1, wherein:

the microtube is formed of a voltage-applicable metal and is capable of giving a charge to the first liquid and the second liquid passing through the flow channel.

4. The micro-fluidic chip according to claim 3, wherein:

a grounded electrode is provided toward an area in which a liquid is turned to a droplet and is given a charge in the flow channel.

5. The micro-fluidic chip according to claim 4, wherein:

a microparticle contained in the first liquid is sorted into arbitrarily-selected one of the branch areas.

6. The micro-fluidic chip according to claim 5, wherein the branch area is filled with a gel for cell culture.

7. A liquid analysis device comprising:

a micro-fluidic chip including a hollow area into which a charged droplet is introduced; and an electrode configured to be provided toward the hollow area; wherein movement direction of a droplet in the hollow area is controlled based on electric force acting between a charge given to the droplet and the electrode;

a plurality of branch areas configured to communicate with the hollow area; wherein the droplet is led to one branch area that is arbitrarily selected by controlling the movement direction of the droplet in the hollow area;

a flow channel configured to send a liquid into the hollow area; and a fluid inlet configured to meet the flow channel at least from one side of the flow channel and introduce a fluid that is a gas or an insulating liquid into the flow channel; wherein a liquid passing through the flow channel is segmented to be turned to a droplet by a fluid introduced from the fluid inlet and is sent into the hollow area;

a microtube configured to introduce a first liquid into a laminar flow of a second liquid passing through the flow channel; wherein the first liquid and the second liquid are sent to the communicating port of the flow channel or a confluence of the fluid inlet in such a way that a laminar flow of the first liquid introduced from the microtube is surrounded by the laminar flow of the second liquid;

the flow channel has a narrowing part that is so formed that area of a section of the narrowing part perpendicular to liquid sending direction gradually decreases; and the first liquid and the second liquid are so sent that laminar flow widths of the laminar flows of the first liquid and the second liquid are narrowed in the narrowing part.

8. A microparticle sorting device comprising:

a hollow area into which a charged droplet including a microparticle is introduced; and an electrode configured to be provided toward the hollow area; wherein movement direction of a droplet in the hollow area is controlled based on electric force acting between a charge given to the droplet and the electrodes a plurality of branch areas configured to communicate with the hollow area; wherein the droplet is led to one branch area that is arbitrarily selected by controlling the movement direction of the droplet in the hollow area;

a flow channel configured to send a liquid into the hollow area; and a fluid inlet configured to meet the flow channel at least from one side of the flow channel and introduce a fluid that is a gas or an insulating liquid into the flow channel; wherein a liquid passing through the flow channel is segmented to be turned to a droplet by a fluid introduced from the fluid inlet and is sent into the hollow area;

a microtube configured to introduce a first liquid into a laminar flow of a second liquid passing through the flow channel; wherein the first liquid and the second liquid are sent to the communicating port of the flow channel or a confluence of the fluid inlet in such a way that a laminar flow of the first liquid introduced from the microtube is surrounded by the laminar flow of the second liquid;

the flow channel has a narrowing part that is so formed that area of a section of the narrowing part perpendicular to liquid sending direction gradually decreases; and the first liquid and the second liquid are so sent that laminar flow widths of the laminar flows of the first liquid and the second liquid are narrowed in the narrowing part.

9. A flow sending method in a micro-fluidic chip, the method comprising the steps of:

introducing a charged droplet into a hollow area provided in the micro-fluidic chip; and controlling movement direction of the droplet in the hollow area based on electric force acting between an electrode provided toward the hollow area and a charge given to the droplet;

wherein the droplet is led to any one branch area selected from a plurality of branch areas communicating with the hollow area by controlling the movement direction of the droplet in the hollow area;

wherein a liquid is turned to a droplet by using a piezoelectric element at a communicating port, to the hollow area, of a flow channel that sends the liquid the hollow area and simultaneously a charge is given to the liquid form a charged droplet and send the charged droplet into the hollow area; and wherein a liquid passing through a flow channel that sends the liquid into the hollow area is segmented and turned to a droplet by introducing a fluid that is a gas or an insulating liquid into the flow channel and simultaneously a charge is given to the liquid form a charged droplet and send the charged droplet into the hollow area.

10. The flow sending method according to claim 9, wherein:

a liquid containing microparticles is segmented and turned to a droplet in units of a predetermined number of microparticles.

11. The flow sending method according to claim 10, wherein:

a droplet containing a microparticle is sorted into arbitrarily-selected one of the branch areas.

* * * * *